(12) United States Patent
Jin

(10) Patent No.: US 8,130,352 B2
(45) Date of Patent: Mar. 6, 2012

(54) IN-PLANE SWITCHING MODE LIQUID CRYSTAL DISPLAY PANEL AND METHOD FOR FABRICATING THE SAME

(75) Inventor: Hyun Suk Jin, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1102 days.

(21) Appl. No.: 12/003,664

(22) Filed: Dec. 28, 2007

(65) Prior Publication Data

US 2008/0239181 A1 Oct. 2, 2008

(30) Foreign Application Priority Data

Mar. 28, 2007 (KR) ........................ 10-2007-0030336

(51) Int. Cl.
*G02F 1/1343* (2006.01)
(52) U.S. Cl. ........................................ 349/141; 349/114
(58) Field of Classification Search ........................ None
See application file for complete search history.

(56) References Cited

U.S. PATENT DOCUMENTS

| 7,190,419 | B2 * | 3/2007 | Park ................................. 349/43 |
| 2006/0132682 | A1 | 6/2006 | Yang et al. |
| 2007/0146591 | A1 * | 6/2007 | Kimura et al. ................ 349/114 |

FOREIGN PATENT DOCUMENTS

CN 1841135 2/2006

* cited by examiner

*Primary Examiner* — Thanh-Nhan Nguyen
(74) *Attorney, Agent, or Firm* — Morgan, Lewis & Bockius LLP

(57) ABSTRACT

A semi-transmissive in-plane switching (IPS) mode liquid crystal display (LCD) panel, in which each pixel region can exhibit the same luminance in transmissive and reflective portions thereof while having a single cell gap structure, is disclosed. A method for fabricating the semi-transmissive IPS mode LCD panel is also disclosed. The panel, in which each pixel region includes a transmissive portion and a reflective portion, comprises a color filter substrate, a thin film transistor substrate assembled with the color filter substrate such that a cell gap is defined between the thin film transistor substrate and the color filter substrate, the thin film transistor substrate including storage capacitors each forming, in the reflective portion of an associated one of the pixel regions, a horizontal electric field different from a horizontal electric field formed in the transmissive portion of the associated pixel region, to compensate for a phase difference generated in the associated pixel region, and a liquid crystal layer dispensed in the cell gap, and oriented in a predetermined direction.

30 Claims, 32 Drawing Sheets

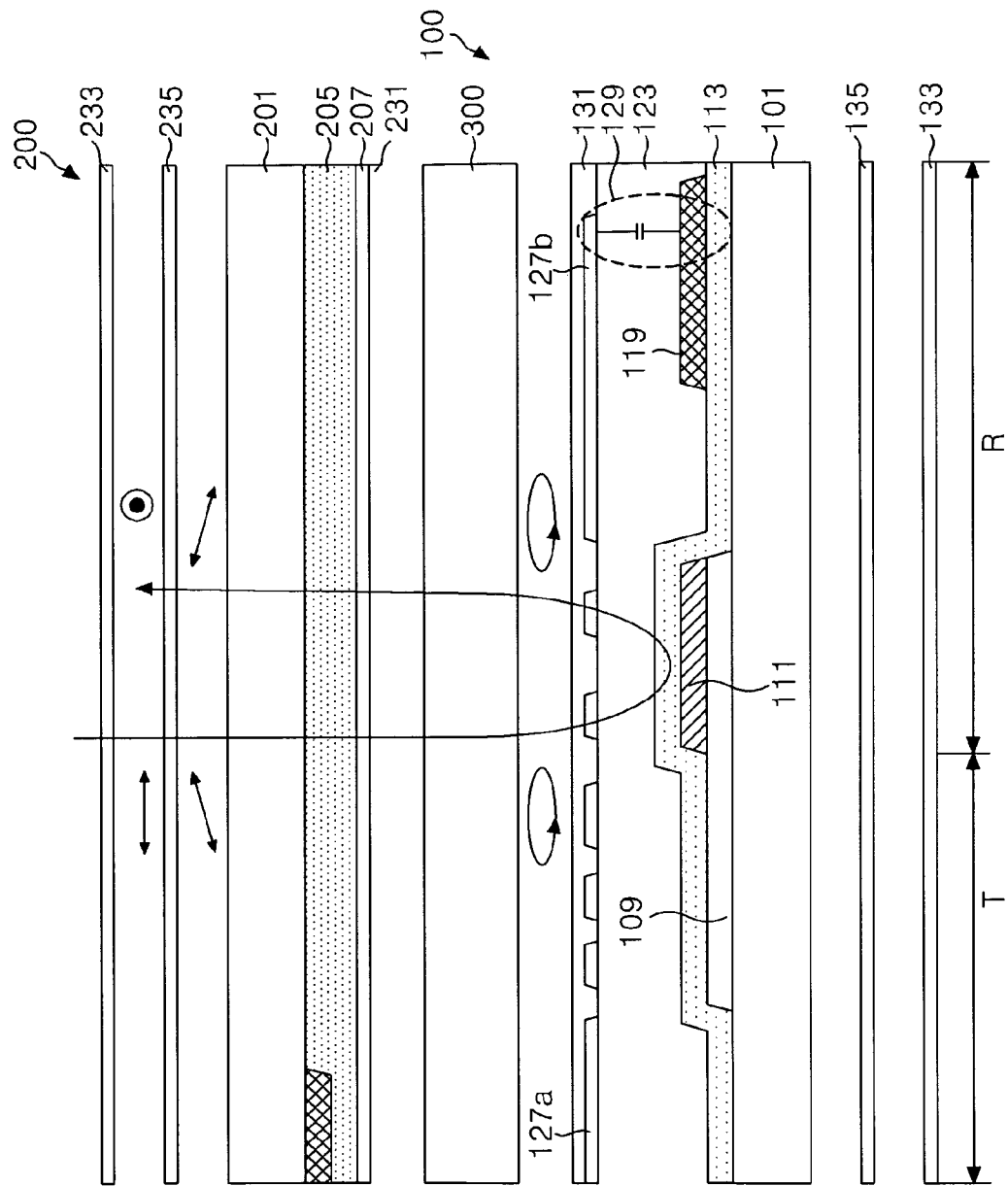

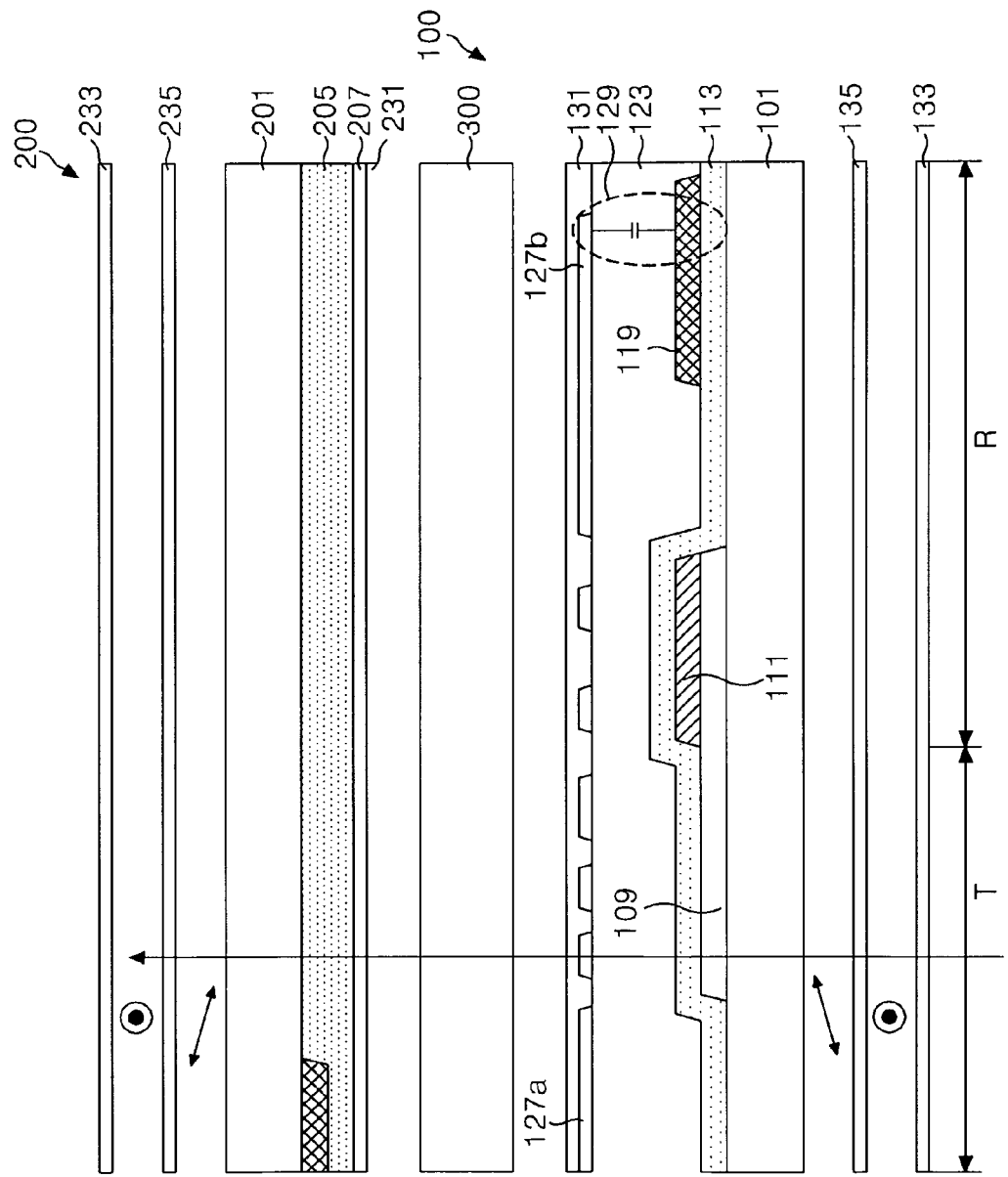

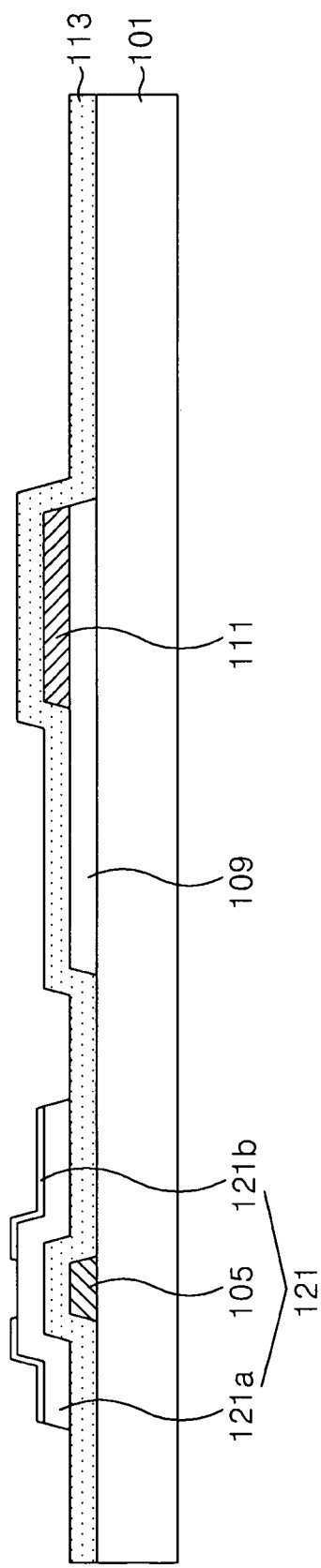

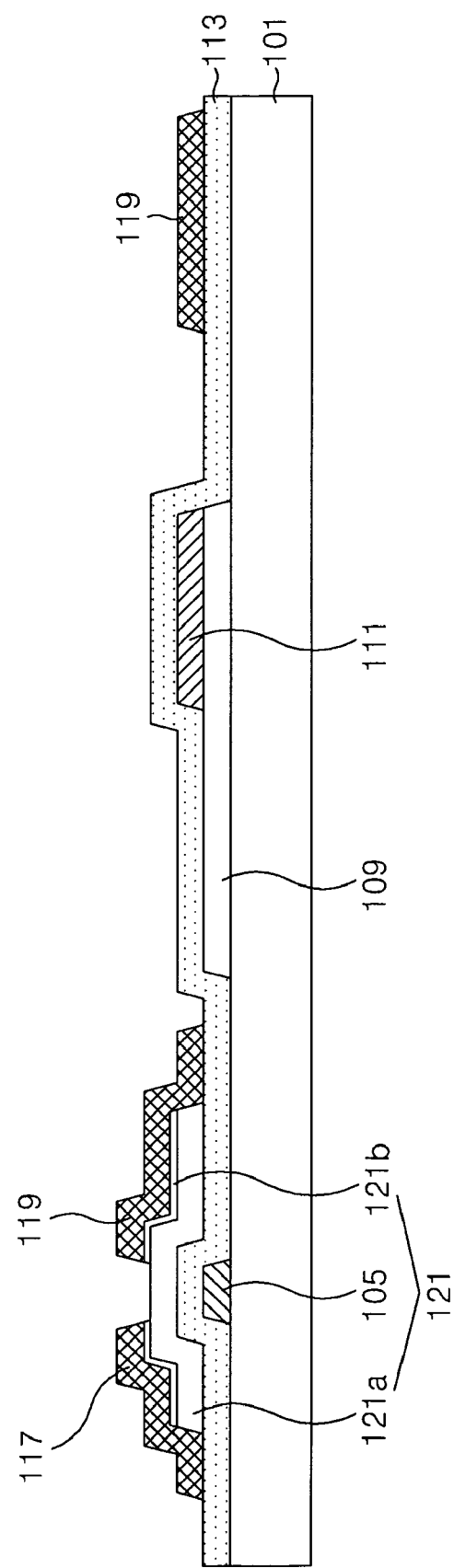

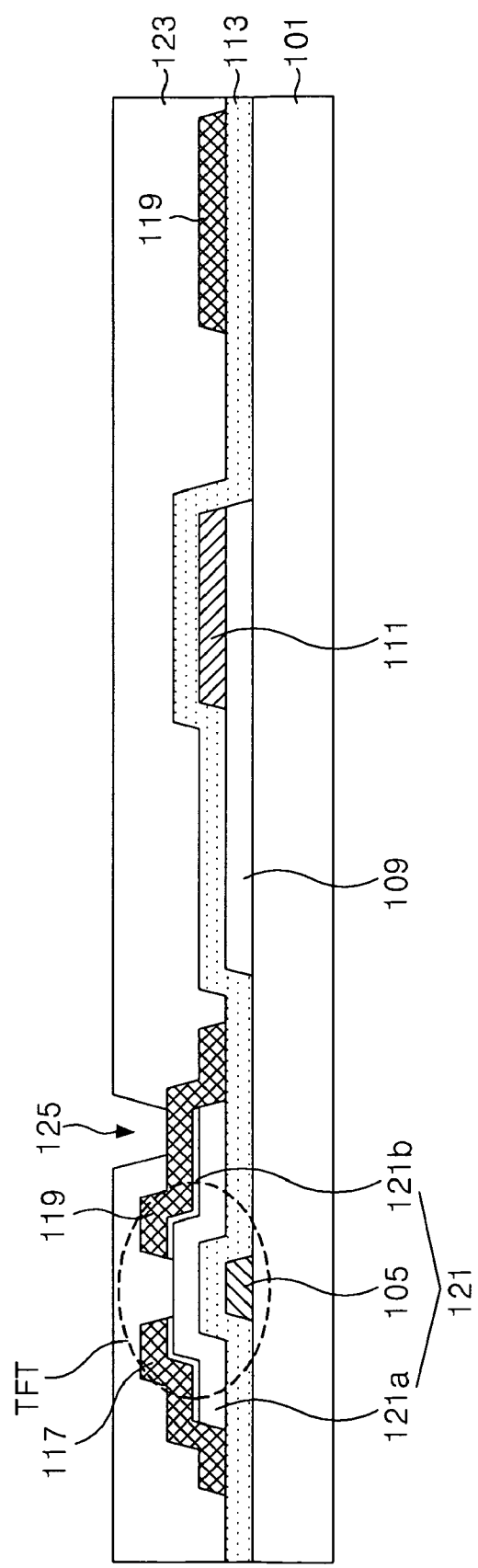

IN-PLANE SWITCHING MODE LIQUID CRYSTAL DISPLAY PANEL AND METHOD FOR FABRICATING THE SAME

This application claims the benefit of the Korean Patent Application No. 2007-030336, filed on Mar. 29, 2007, which is hereby incorporated by reference as if fully set forth herein.

BACKGROUND OF THE INVENTION

1. Field of the Invention

The present invention relates to a semi-transmissive in-plane switching mode liquid crystal display panel and a method for fabricating the same, and more particularly, to a semi-transmissive in-plane switching mode liquid crystal display panel, in which each pixel region can exhibit the same luminance in transmissive and reflective portions thereof while having a single cell gap structure, and a method for fabricating the same.

2. Discussion of the Related Art

Liquid crystal display (LCD) devices display an image by adjusting the light transmittance of liquid crystals. Such LCD devices are classified into a twisted nematic (TN) mode and an in-plane switching (IPS) mode.

In a TN mode LCD device, a common electrode formed on an upper substrate and a pixel electrode formed on a lower substrate are arranged to face each other. TN mode liquid crystals are driven by a vertical electric field generated between the common electrode and the pixel electrode.

Such a TN mode LCD device has an advantage of a high aspect ratio, but has a drawback of a narrow viewing angle of about 90°.

In order to solve the above-mentioned drawback of the TN mode LCD device, an IPS mode LCD device was proposed. In the IPS mode LCD device, liquid crystals are driven by a horizontal electric field generated between a pixel electrode and a common electrode formed on a lower substrate. In this case, large viewing angle characteristics of about 160° are obtained.

Hereinafter, the configuration and operation of an IPS mode LCD device will be described with reference to FIGS. 1 to 3.

As shown in FIG. 1, the IPS mode LCD device 70, in which liquid crystals are driven by a horizontal electric field formed between a pixel electrode and a common electrode, includes a thin film transistor (TFT) substrate 30 and a color filter substrate 50 assembled such that a liquid crystal layer is interposed between the TFT substrate 30 and the color filter substrate 50.

As shown in FIGS. 1 and 2, the TFT substrate 30 includes a lower substrate 31, a plurality of gate lines 32 formed on the lower substrate 31, common electrodes 35 connected to common lines 34 formed on the same layer as the gate lines 32, and data lines 37 formed to intersect the gate lines 32 such that a gate insulating film 36 is interposed between the data lines 37 and the gate lines 32. The gate lines 32 and data lines 37 define pixel regions. The TFT substrate 30 also includes TFTs formed at respective intersections of the gate lines 32 and data lines 37, a passivation film 42 covering the TFTs, pixel electrodes 43 formed on the passivation film 42, and a lower orientation film 44 covering the pixel electrodes 43. In each pixel region, one pixel electrode 43 and one common electrode 35 are arranged such that electrode portions thereof are alternately arranged.

Each TFT includes a gate electrode 33 connected to the associated gate line 32, a source electrode 38 connected to the associated data line 37, a drain electrode 39 formed to face the source electrode 38 at opposite sides of a channel, and a semiconductor pattern. The semiconductor pattern includes an active layer 40, which forms the channel, and an ohmic contact layer 41.

As shown in FIGS. 1 and 3, the color filter substrate 50 includes an upper substrate 51, a black matrix 52 formed on the upper substrate 51, to partition the pixel regions and to avoid the occurrence of a light leakage phenomenon, and color filters 53 respectively formed in the pixel regions partitioned by the black matrix 52. The color filter substrate 50 also includes an overcoating layer 54 removing steps formed by the color filters 53, to planarize an upper surface of the upper substrate 51, spacers 55 formed on the overcoating layer 54, to maintain a desired cell gap, and an upper orientation film 56.

Recently, a semi-transmissive IPS mode LCD device has been proposed. The semi-transmissive IPS mode LCD device is fabricated by additionally forming reflective electrodes in an IPS mode LCD device having the above-mentioned configuration. The reflective electrodes function to reflect light externally incident to the LCD device. Thus, each pixel region of the semi-transmissive IPS mode LCD device includes a transmissive portion where an image is displayed by incident light from a backlight unit, and a reflective portion where an image is displayed by light reflected by one reflective electrode.

Hereinafter, the configuration and operation of a conventional semi-transmissive IPS mode LCD device will be described with reference to FIG. 4.

In the semi-transmissive IPS mode LCD device, liquid crystals are driven by a horizontal electric field in each pixel region divided into a transmissive portion and a reflective portion. As shown in FIG. 4, the semi-transmissive IPS mode LCD device includes a TFT substrate 11 formed with a plurality of lines and a plurality of TFTs, a color filter substrate 21 arranged to face the TFT substrate 11, and a liquid crystal layer 15 filled in a cell gap defined between the two substrates 11 and 21.

The TFT substrate 11 includes gate lines and data lines formed such that they intersect each other, to define pixel regions, and TFTs formed at respective intersections of the gate lines and data lines. The TFT substrate 11 also includes an organic insulating film 18 formed in a reflective portion of each pixel region, a reflective electrode 60 formed on the organic insulating film 18, to reflect externally-incident light, a pixel electrode 17 formed at the same layer as the reflective electrode 60 in a transmissive portion of each pixel region, a passivation film 16 covering the reflective electrode 60 and pixel electrode 17, and a common electrode 24 formed on the passivation film 16, to generate a horizontal electric field in cooperation with the pixel electrode 17.

The above-mentioned semi-transmissive IPS mode LCD device has a dual cell gap structure in which the cell gap defined in the transmissive portion corresponds to about 2 times the cell gap defined in the reflective portion, due to the organic insulating film 60 formed in the reflective portion. By virtue of this dual cell gap structure, the phase difference between the reflective portion and the transmissive portion is compensated for. Thus, the same luminance characteristics are obtained in both the reflective and transmissive portions of each pixel region.

In order to form the dual cell gap structure, and thus to obtain the same luminance characteristics in both the reflective and transmissive portions of each pixel region, however, it is necessary to use an additional process for the formation of the organic insulating film 18 in the reflective portion. For this reason, the overall process is complex. Furthermore, a degradation in process efficiency occurs.

SUMMARY OF THE INVENTION

Accordingly, the present invention is directed to an in-plane switching mode liquid crystal display panel and a method for fabricating the same that substantially obviate one or more problems due to limitations and disadvantages of the related art.

An object of the present invention is to provide a semi-transmissive in-plane switching mode liquid crystal display panel, in which each pixel region can exhibit the same luminance in transmissive and reflective portions thereof while having a single cell gap structure, and a method for fabricating the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an in-plane switching mode liquid crystal display panel having pixel regions each including a transmissive portion and a reflective portion comprises: a color filter substrate; a thin film transistor substrate assembled with the color filter substrate such that a cell gap is defined between the thin film transistor substrate and the color filter substrate, the thin film transistor substrate including storage capacitors each forming, in the reflective portion of an associated one of the pixel regions, a horizontal electric field different from a horizontal electric field formed in the transmissive portion of the associated pixel region, to compensate for a phase difference generated in the associated pixel region; and a liquid crystal layer dispensed in the cell gap, and oriented in a predetermined direction.

In another aspect of the present invention, a method for fabricating an in-plane switching mode liquid crystal display panel having pixel regions each including a transmissive portion and a reflective portion comprises: fabricating a color filter substrate; fabricating a thin film transistor substrate assembled with the color filter substrate such that a cell gap is defined between the thin film transistor substrate and the color filter substrate, the thin film transistor substrate including storage capacitors each forming, in the reflective portion of an associated one of the pixel regions, a horizontal electric field different from a horizontal electric field formed in the transmissive portion of the associated pixel region, to compensate for a phase difference generated in the associated pixel region; and dispensing a liquid crystal layer in the cell gap, the liquid crystal layer being oriented in a predetermined direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings:

FIG. 7A is a schematic view illustrating an optical path of light incident to a reflective portion of a pixel region, which is set to a normally-black mode in accordance with the present invention;

FIG. 7B is a schematic view illustrating an optical path of incident light passing through a transmissive portion of a pixel region, which is set to a normally-black mode in accordance with the present invention;

FIGS. 11A and 11B illustrate the TFT substrate formed with semiconductor patterns forming channels according to the present invention, through a plan view and a sectional view;

FIGS. 12A and 12B illustrate the TFT substrate formed with a second conductive pattern according to the present invention, through a plan view and a sectional view;

FIGS. 13A and 13B illustrate the TFT substrate formed with a lower passivation film according to the present invention, through a plan view and a sectional view;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First, the configuration and operation of a semi-transmissive in-plane switching (IPS) mode liquid crystal display (LCD) panel according to the present invention will be described with reference to FIGS. 5 and 6.

Figure 1:
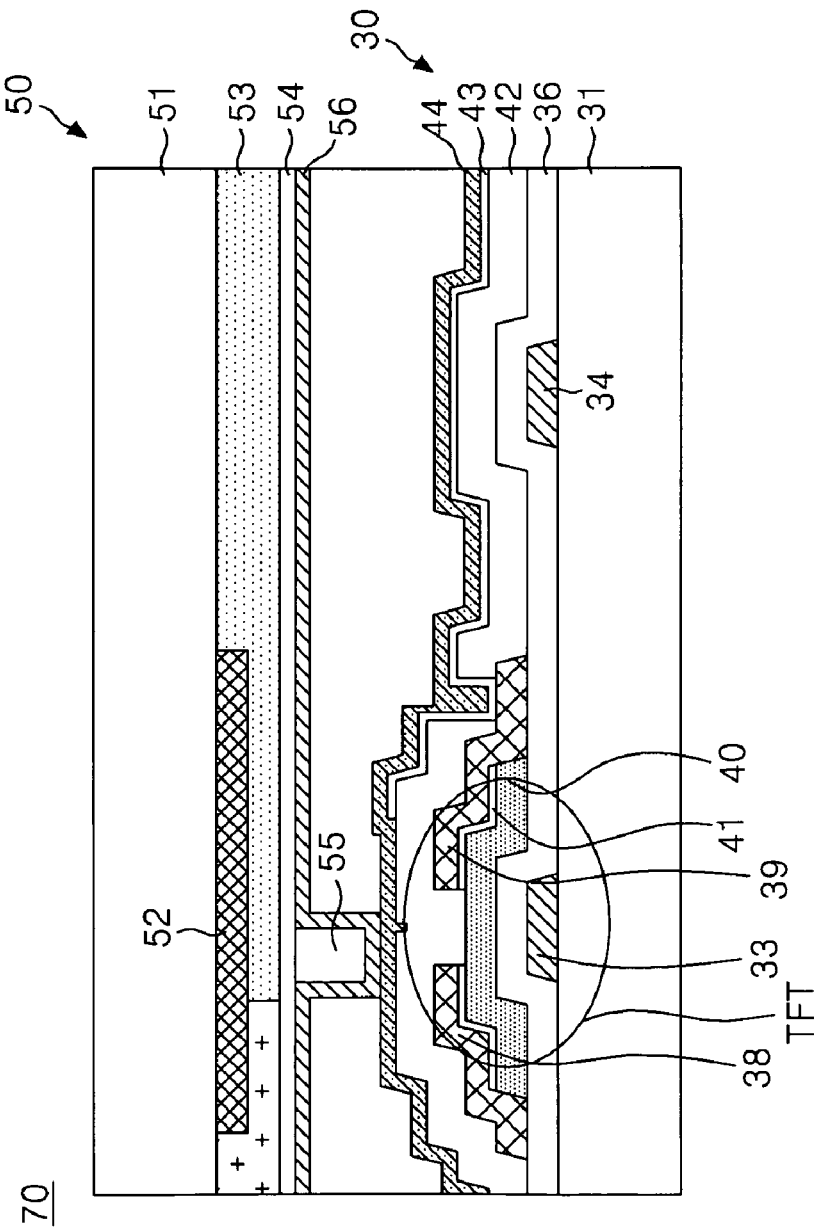
FIG. 1 is a sectional view of a convention in-plane switching (IPS) mode liquid crystal display (LCD) panel.
Figure 2:
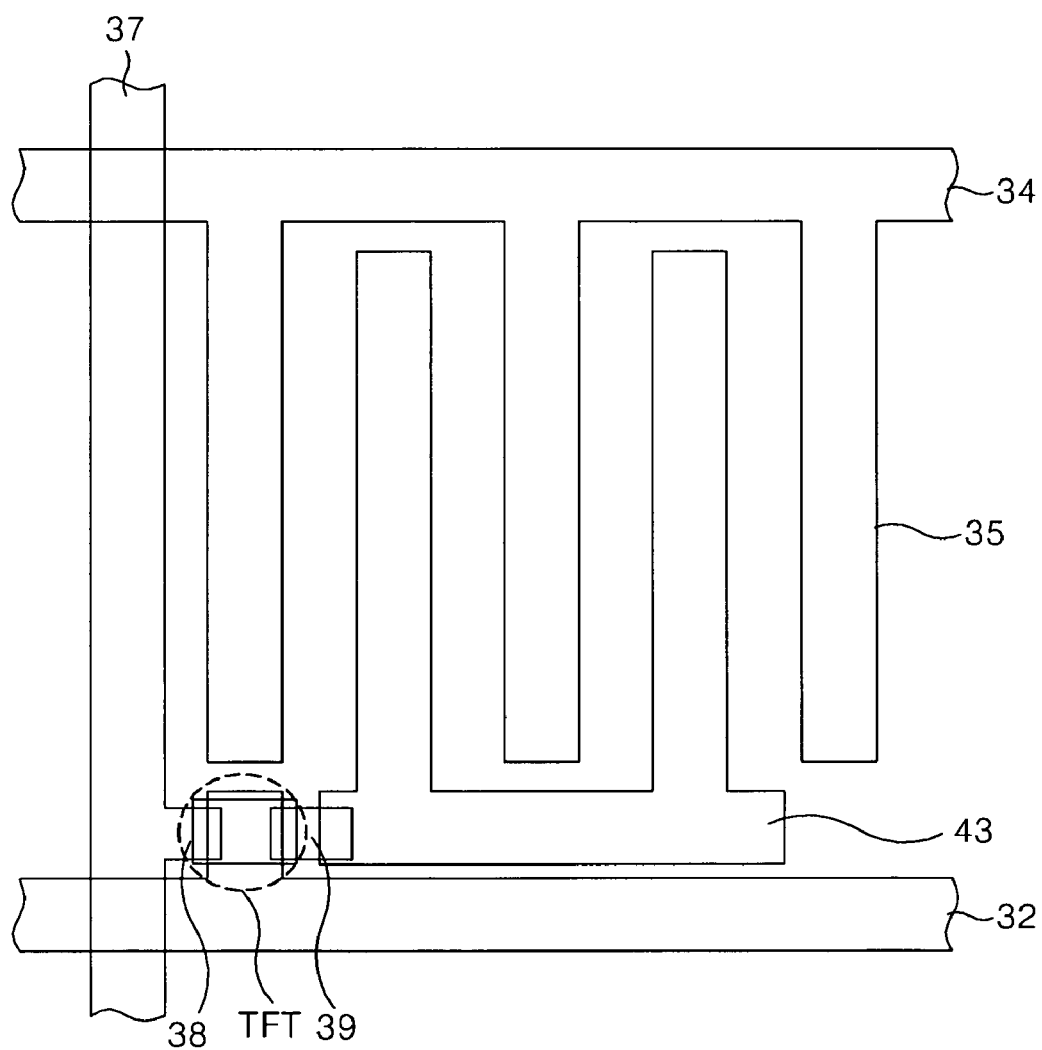
FIG. 2 is a plan view of a thin film transistor included in the IPS mode LCD panel shown in FIG. 1.
Figure 3:
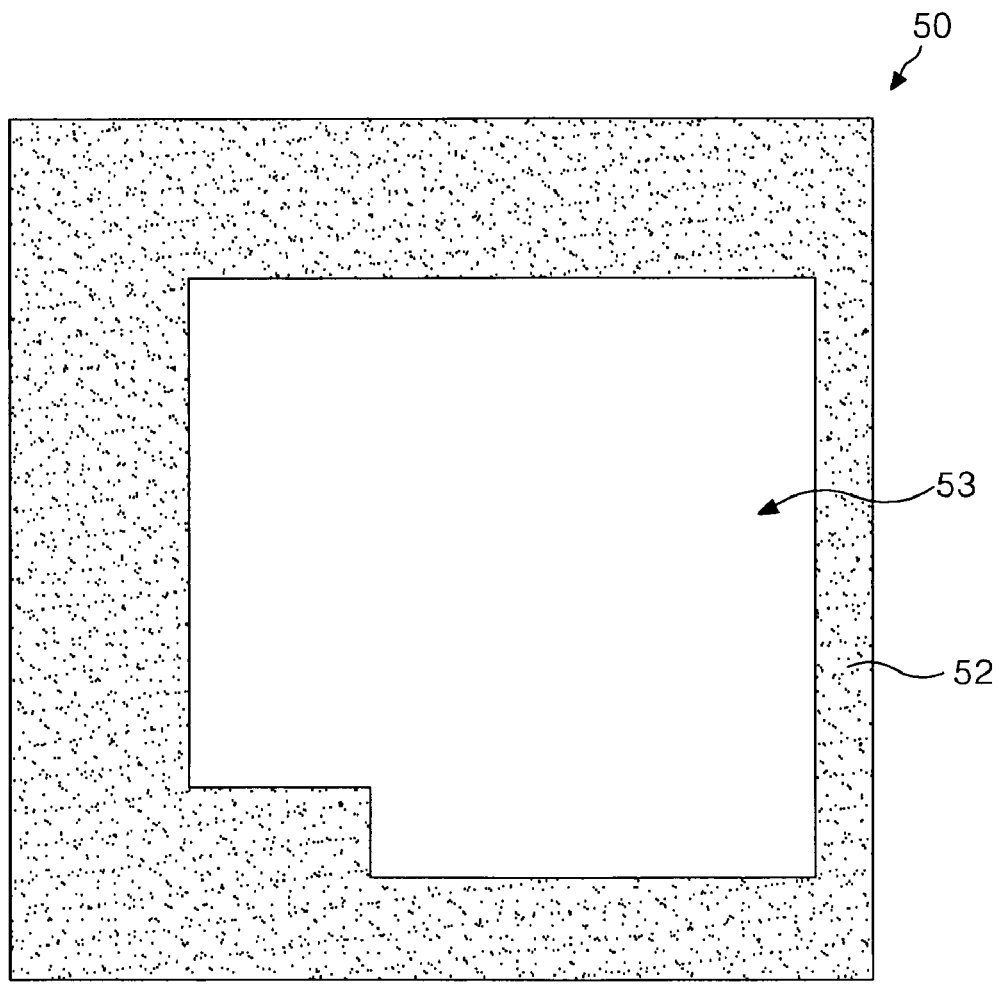
FIG. 3 is a plan view of a color filter substrate included in the IPS mode LCD panel shown in FIG. 1.
Figure 4:
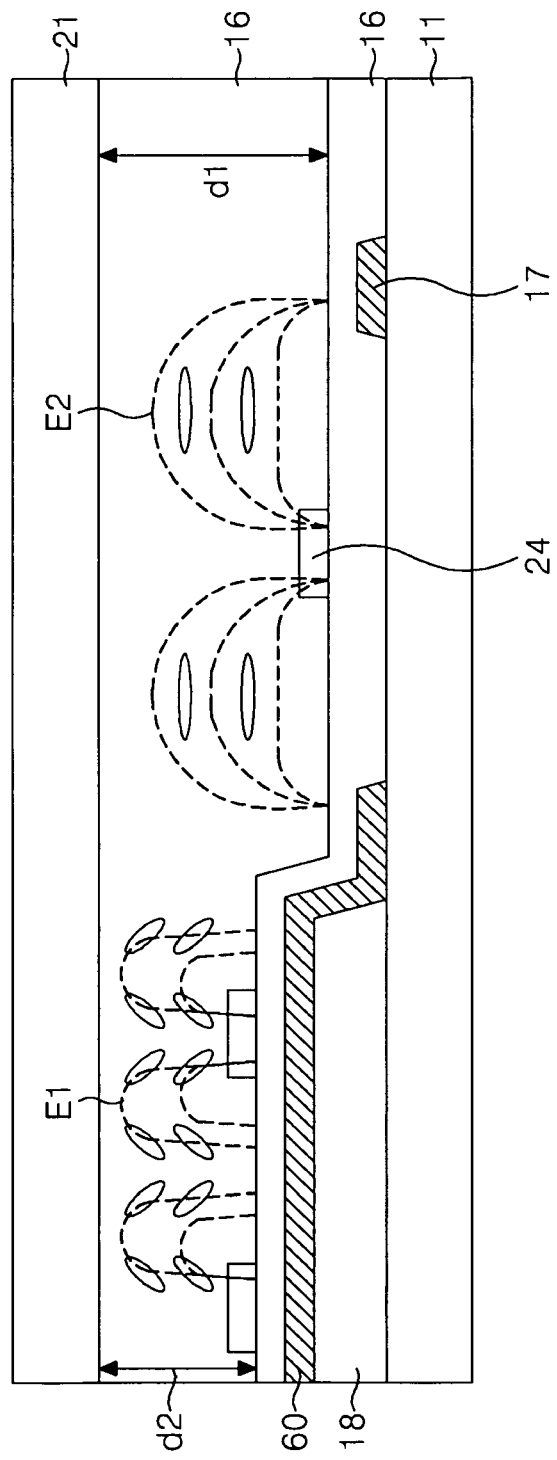
FIG. 4 is a sectional view of a conventional semi-transmissive IPS mode LCD panel.
Figure 5:
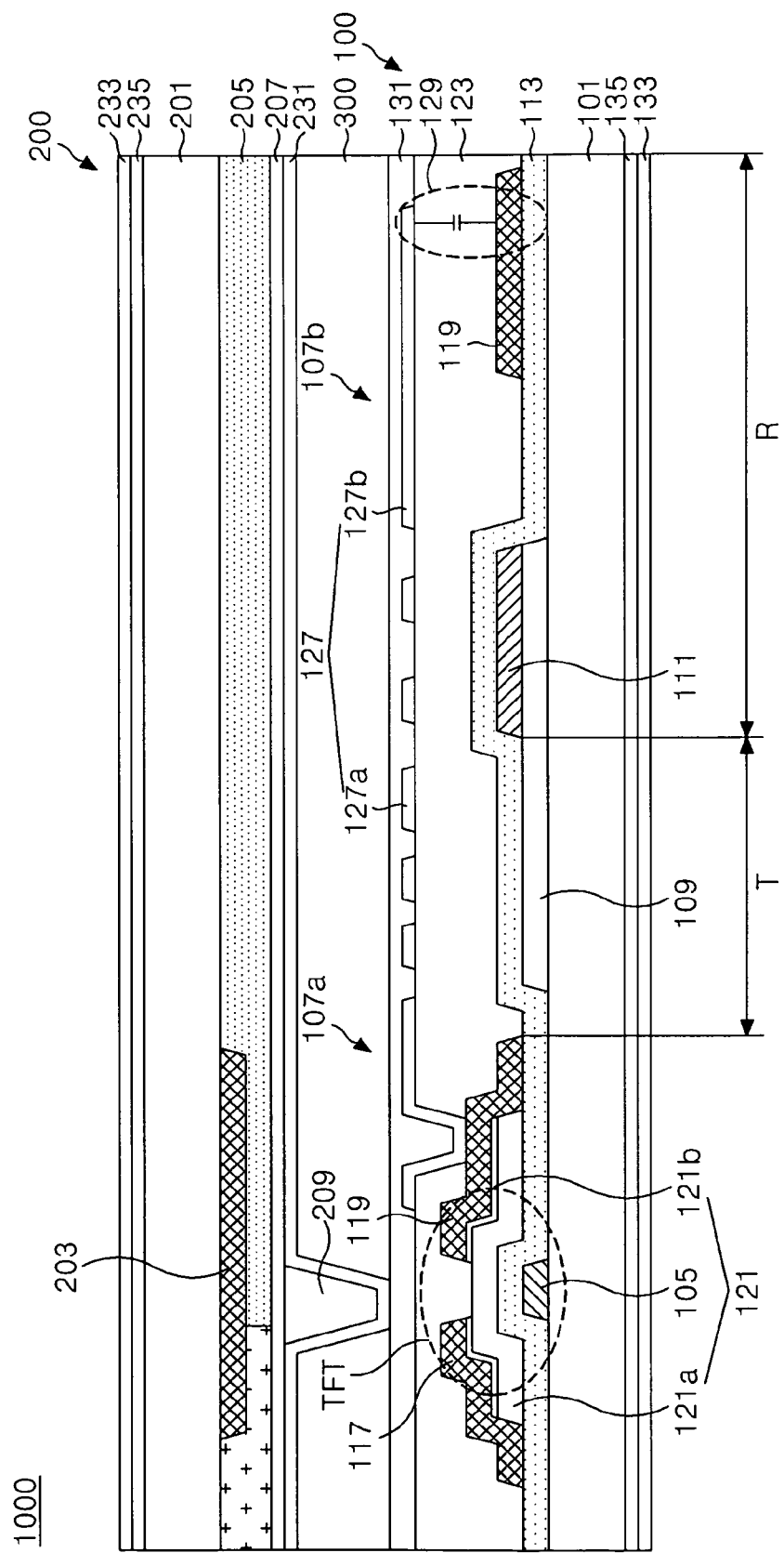
FIG. 5 is a sectional view of a semi-transmissive IPS mode LCD panel according to the present invention.

As shown in FIG. 5, the semi-transmissive IPS mode LCD panel 1000 includes a thin film transistor (TFT) substrate 100 formed with a plurality of lines and a plurality of TFTs, a color filter substrate 200 arranged to face the TFT substrate 100, and formed with color filters such that the color filters correspond to respective pixel regions, and a liquid crystal layer 300 dispensed in a cell gap defined between the two substrates 100 and 200, and oriented in a certain direction.

Figure 6A:
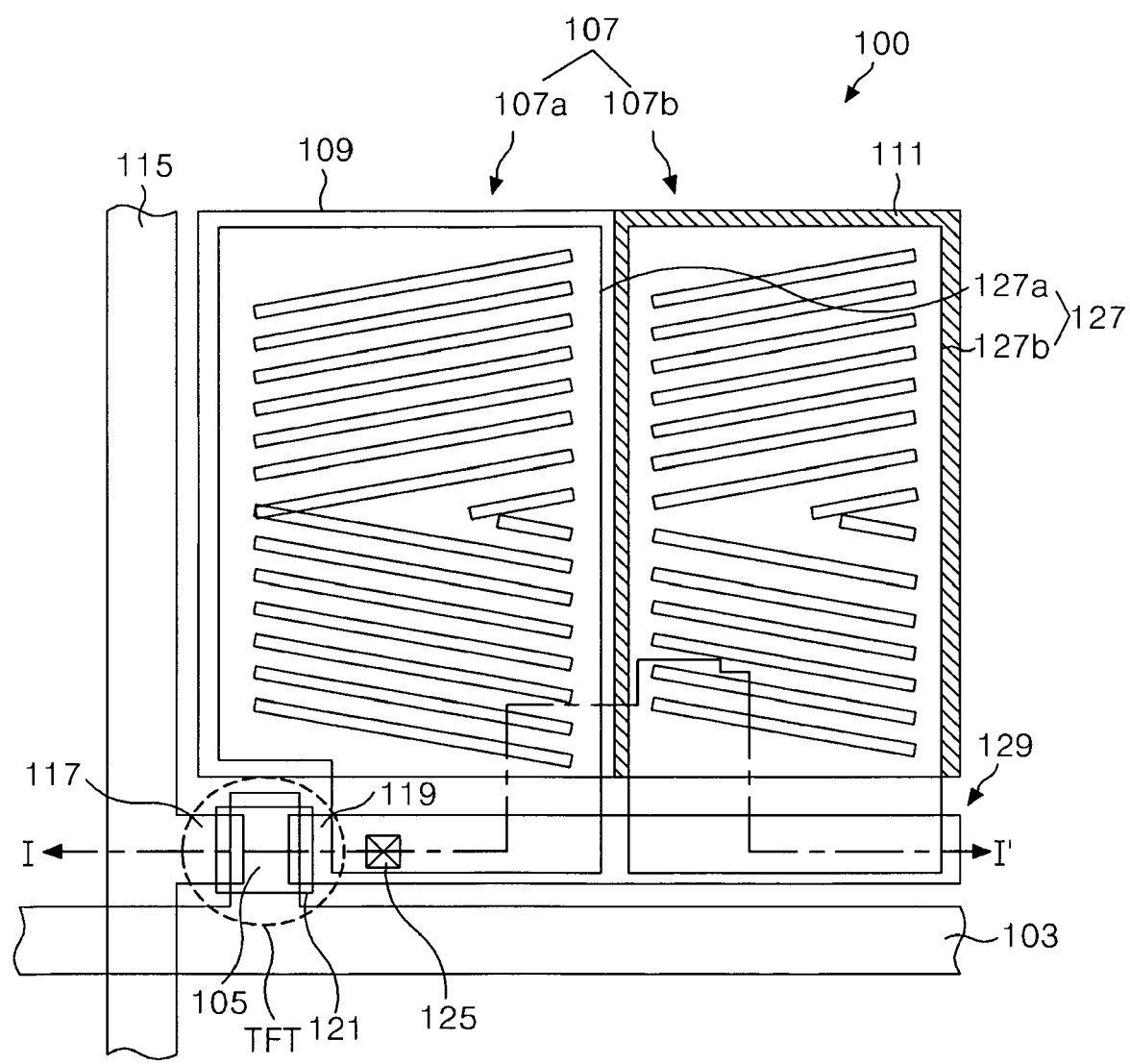
FIGS. 6A and 6B illustrate a thin film transistor included in the semi-transmissive IPS mode LCD panel shown in FIG. 5, through a plan view and a sectional view.
Figure 6B:
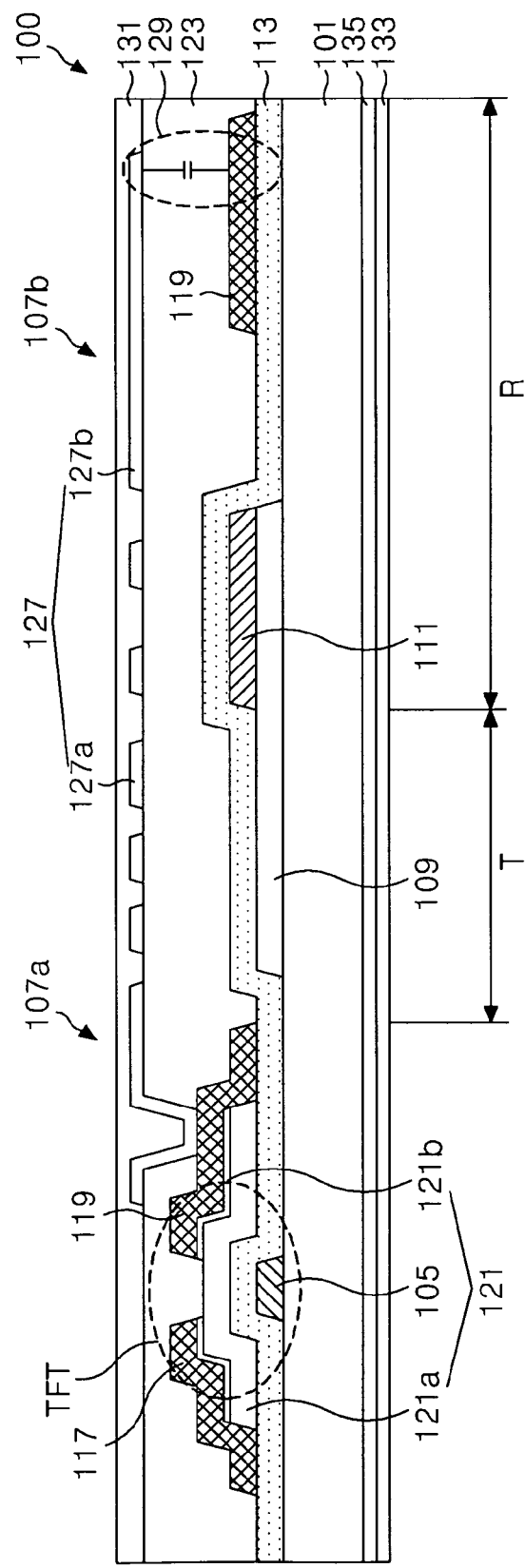

As shown in FIGS. 6A and 6B, the TFT substrate 100 includes a lower substrate 101, a plurality of gate lines 103 formed on the lower substrate 101, data lines 115 formed such that the data lines 115 intersect the gate lines 103, to define pixel regions 107, and TFTs formed at respective intersections of the gate lines 103 and data lines 115. The TFT substrate 100 also includes a common electrode 109 formed to cover transmissive and reflective portions 107a and 107b of each pixel region 107, a reflective electrode 111 formed to overlap with the common electrode 109 in the reflective portion 107b of the pixel region 107, and a passivation film 123 covering the TFTs. The TFT substrate 100 further includes a pixel electrode 127 formed in each pixel region. The pixel electrode 127 includes a first pixel electrode 127a generating a first horizontal electric field in the transmissive portion 107a of the pixel region in accordance with a first data voltage supplied from the associated TFT, and a second pixel electrode 127b generating a second horizontal electric field in the reflective portion 107b of the pixel region in accordance with a second data voltage supplied from the external of the panel. The TFT substrate 100 further includes a storage capacitor 129 supplying the second data voltage to the second pixel electrode 127b, and a lower orientation film 131 functioning to orient the liquid crystal layer 300 dispensed in the cell gap in a certain direction.

The TFT substrate 100 further includes a lower polarizing plate 133 and a lower phase retardation plate 135 laminated, in this order, on a back surface of the lower substrate 101.

Each gate line 103 sends, to a gate electrode 105 of each TFT associated with the gate line 103, a gate signal supplied from a gate driver (not shown) connected to a gate pad of the gate line 103.

The common electrode 109 formed in each pixel region 107 generates a horizontal electric field for the orientation of the liquid crystals, in cooperation with the associated pixel electrode 127, in response to a common voltage supplied from a common line (not shown). The common electrode 109 is formed on the same layer as the gate electrode 105 such that the common electrode 109 covers the transmissive and reflective portions 107a and 107b of the pixel region.

In this case, the common electrode 109 may have a flat plate structure covering the pixel region 107 or may have a structure including electrode portions arranged alternately with those of the pixel electrode 127 in the pixel region 107. The common electrode 109 is made of a transparent conductive material such as indium tin oxide (ITO), to allow incident light from a backlight unit to be transmitted toward the color filter substrate 200 through the common electrode 109.

The reflective electrode 111 is formed to overlap with the common electrode 109 formed in the reflective portion 107b of the pixel electrode 107. The reflective electrode 111 functions to reflect externally-incident light toward the color filter substrate 200.

The data lines 115 are formed such that they intersect the gate lines 103 under the condition in which a gate insulating film 113 is interposed between the data lines 115 and the gate lines 103, to define respective pixel regions 107. Each data line 115 functions to transmit a data signal supplied from a data driver (not shown) connected to a data pad of the data line 115 to source and drain electrodes 117 and 119 in the associated TFTs, in response to an ON/OFF state of the gate electrodes 105 of the TFTs.

Each TFT functions to charge a pixel signal from the associated data line 115 in the pixel electrode 127 of the TFT, in response to a gate signal from the associated gate line 103. The gate electrode 105 of each TFT is connected to the associated gate line 103. The source electrode 117 of each TFT is connected to the associated data line 115. The drain electrode 119 of each TFT is arranged to face the source electrode 117 at opposite sides of a channel, and is connected to the associated pixel electrode 127 via a contact hole 125 extending through the passivation film 123.

Each TFT further includes a semiconductor pattern 121. The semiconductor pattern 121 includes an active layer 121a formed to cover the gate electrode 105 of the TFT under the condition in which the gate insulating film 113 is interposed between the active layer 121a and the gate electrode 105. The active layer 121a forms a channel. The semiconductor pattern 121 also includes an ohmic contact layer 121b formed over the active layer 121a, to provide an ohmic contact for the source and drain electrodes 117 and 119 of the TFT.

The drain electrode 119 of each TFT supplies a first data voltage to the first pixel electrode 127a connected to the drain electrode 119 via the associated contact hole 125 extending through the passivation film 123. By the first data voltage, a first horizontal electric field is formed between the first pixel electrode 127a and the common electrode 109 in the associated pixel region 107, to orient the liquid crystal layer 300 dispensed in the transmissive portion 107a of the pixel region 107 in a certain direction.

The drain electrode 119 of each TFT extends to the reflective portion 107b of the associated pixel region 107 such that the drain electrode 119 overlaps with the associated second pixel electrode 127b under the condition in which the passivation film 123 is interposed between the drain electrode 119 and the second pixel electrode 127b, in order to form the associated storage capacitor 129 supplying the second data voltage to the second pixel electrode 127b.

Each pixel electrode 127 is formed in the associated pixel region 107 such that the pixel electrode 127 is electrically connected with the drain electrode 119 of the associated TFT via the associated contact hole 127 formed through the passivation film 123.

As described above, the pixel electrode 127 includes the first and second pixel electrodes 127a and 127b respectively forming first and second horizontal electric fields to orient the portions of the liquid crystal layer 300 in the transmissive and reflective portions 107a and 107b of the associated pixel region 107, in cooperation with the common electrode 109. Each of the first and second pixel electrodes 127a and 127b has a plurality of slits shaped into symmetrical comb patterns, to allow the associated horizontal electric field to pass through the pixel electrode.

The first pixel electrode 127a is connected to the drain electrode 119 of the associated TFT via the associated contact hole 125 formed through the passivation film 123. The first pixel electrode 127a forms the first horizontal electric field in accordance with the first data voltage supplied from the drain electrode 119. By the generated first horizontal electric field, the liquid crystals dispensed in the transmissive portion 107a of the associated pixel region 107 are oriented in a certain direction.

The second pixel electrode 127b overlaps with the drain electrode 119 while being spaced apart from the first pixel electrode 127a by a certain distance, under the condition in which the passivation film 123 is interposed between the second pixel electrode 127b and the drain electrode 119. The second pixel electrode 127b forms the second horizontal electric field in accordance with the second data voltage supplied from the associated storage capacitor 129. By the generated second horizontal electric field, the liquid crystals dispensed in the reflective portion 107b of the associated pixel region 107 are oriented in a certain direction.

The second data voltage applied to the second pixel electrode 127b is lower than the first data voltage, due to a voltage drop caused by a parasitic resistance formed in the storage capacitor 129. As a result, a phase difference generated between the transmissive and reflective portions 107a and 107b of the pixel region 107 is removed.

That is, when the first data voltage from the drain electrode 119 is applied to the first pixel electrode 127a, the liquid crystal layer 300 in the transmissive portion 107a of the pixel region 107 exhibits the following phase retardation with respect to light incident from the color filter plate 200.

$$\delta = 66 \cdot n \cdot d = \Delta neff \cdot d$$

(where, "$\delta$" represents the phase retardation, "$\Delta n$" represents the refractive index of the liquid crystal layer, "d" represents the travel length of the incident light, and "$\Delta neff$" represents the effective refractive index of the liquid crystal layer.)

When the second data voltage from the storage capacitor 129 is applied to the second pixel electrode 127b, the liquid crystal layer 300 in the reflective portion 107b of the pixel region 107 exhibits the following phase retardation with respect to light incident from the color filter plate 200 and light reflected from the reflective electrode 111.

$$\delta = 2\Delta n \cdot d$$

(where, "$\delta$" represents the phase retardation, "$2\Delta n$" represents the refractive index of the liquid crystal layer with respect to the incident light and reflected light, and "d" represents the travel length of the incident light.)

In this case, the second data voltage applied to the second pixel electrode 127b is lower than the first data voltage, due to a voltage drop caused by a parasitic resistance in the storage capacitor 129, as described above. As a result, the liquid crystal layer 300 in the reflective portion 107b of the pixel region 107 substantially exhibits the following phase retardation.

$$\delta = 2\Delta n \cdot d = 2 \cdot (\tfrac{1}{2} \cdot \Delta neff) \cdot d \approx \Delta neff \cdot d$$

That is, as the second data voltage, which is lower than the first data voltage, is supplied to the second pixel electrode 127b, the effective refractive index of the liquid crystal layer 300 in the reflective portion 107b is reduced. As a result, there is no phase difference between the transmissive and reflective portions 107a and 107b of the pixel region 107. Thus, a uniform luminance is obtained in the pixel region 107.

Each storage capacitor 129 functions to supply the second data voltage to the second pixel electrode 127b of the associated pixel region 107. The storage capacitor 129 includes the drain electrode 119 of the associated TFT extending to the reflective portion 107b of the pixel region 107, and the second pixel electrode 127b formed to overlap with the drain electrode 119 via the passivation film 123.

As described above, the second data voltage supplied from the storage capacitor 129 is lower than the first data voltage, due to a voltage drop caused by a parasitic capacity of the storage capacitor 129.

The lower orientation film 131 functions to orient the liquid crystal layer 300 dispensed in the cell gap in a certain direction. The lower orientation film 131 is formed by rubbing an organic orientation film made of polyimide or the like through a rubbing process. The lower orientation film 131 is formed with orientation grooves (not, shown) to align liquid crystal molecules of the liquid crystal layer 300 in a certain direction.

The lower polarizing plate 133 functions to allow only the components of the incident light from the backlight unit having an optical axis aligned with the polarizing axis of the lower polarizing plate 133 to be transmitted toward the color filter substrate 200 through the lower polarizing plate 133. The polarizing axis of the lower polarizing plate 133 is parallel with the rubbing direction of the lower orientation film 131 while being perpendicular to the polarizing axis of an upper polarizing plate, which will be described later.

The lower phase retardation plate 135 is formed between the lower substrate 101 and the lower polarizing plate 133, to set the transmissive portion 107a of each pixel region 107 to a normally-black mode, in cooperation with the upper polarizing plate included in the color filter substrate 200.

In this case, the lower phase retardation plate 135 comprises a $\lambda/2$ phase retardation plate, namely, a half wave plate (HWP), having an optical axis deviated from the optical axis of the lower polarizing plate 133 by 67.5° or deviated from the optical axis of the upper polarizing plate included in the color filter substrate 200 by 157.5°.

When the first data voltage is not applied to the first pixel electrode 127a formed in the transmissive portion 107a of the pixel region 107, the incident light from the backlight unit is converted into vertical linearly-polarized light while passing through the lower polarizing plate 133, as shown in FIG. 7B.

The vertical linearly-polarized light emerging from the lower polarizing plate 133 is then converted into light linearly polarized in a 45° direction while passing through the lower phase retardation plate 135. The converted light is subsequently converted into light linearly polarized in a 145° (−45°) direction while passing through the liquid crystal layer 300 having a 90° phase difference. Finally, the resultant linearly-polarized light reaches the upper phase retardation plate of the color filter substrate 200.

The linearly-polarized light reaching the upper phase retardation plate 235 of the color filter substrate 200 is again converted into light linearly polarized in a 45° direction. Thus, when the linearly-polarized light reaches the upper polarizing plate, it has the form of vertical linearly-polarized light, as in the initial incidence stage thereof. By this light, the transmissive portion 107a of the pixel region 107 is set to the normally-black mode.

As shown in FIG. 5, the color filter substrate 200 includes an upper substrate 201, a black matrix 203 formed on the upper substrate 201, color filters 205 formed in respective pixel regions partitioned by the black matrix 203, and overcoating layer 207 to remove steps formed on the upper substrate 201 due to the color filters 205. The color filter substrate 200 also includes spacers 209 formed on the overcoating layer 207, to maintain the cell gap, in which liquid crystals forming the liquid crystal layer 300 are dispensed, and an upper orientation film 231 formed such that the upper orientation film 231 covers the overcoating layer 207, to orient the liquid crystal layer 300 in the cell gap in a certain direction.

The color filter substrate 200 further includes an upper polarizing plate 233 and an upper phase retardation plate 235 laminated, in this order, over a back surface of the upper substrate 201.

The black matrix 203 is formed on the upper substrate 201 in the form of a matrix, to partition a plurality of cell regions where the color filters 205 will be formed, and to prevent optical interference between adjacent cell regions.

The black matrix 203 is formed to overlap with regions other than the pixel electrodes 127 of the TFT substrate 100, namely, the gate lines 103, data lines 115, and TFTs.

The color filters 205 are formed in the cell regions partitioned by the black matrix 203, respectively. Each color filter 205 includes a red color filter 205R, a green color filter 205G, and a blue color filter 205B formed by sequentially spraying red, green, and blue photosensitive color resin materials over the upper substrate 201 in accordance with a pigment spraying process or the like, while etching the photosensitive color resin material film formed in each pigment spraying process in accordance with a photolithography process using a mask.

The overcoating layer 207 functions to remove steps formed on the upper substrate 201 due to the color filters 205, and thus to allow the upper orientation film 231, which will be formed in a subsequent process, to have a planarized surface.

The spacers 209 functions to maintain the cell gap, in order to enable the liquid crystal layer 300 to be dispensed between the TFT substrate 100 and the color filter substrate 200. In this case, the spacers 209 are formed to overlap with the black matrix 203 arranged on the overcoating layer 207.

The upper orientation film 231 is formed over the overcoating layer 207 arranged on the spacer 209, to orient the liquid crystal layer 300 dispensed in the cell gap in a certain direction. The upper orientation film 231 is formed by rubbing an organic orientation film made of polyimide or the like through a rubbing process. The upper orientation film 231 is formed with orientation grooves (not shown) to align the liquid crystal molecules of the liquid crystal layer 300 in a certain direction.

The upper polarizing plate 233 functions to allow only the components of externally-incident light having an optical axis aligned with the polarizing axis of the upper polarizing plate 233 to be transmitted toward the pixel regions 107 through the upper polarizing plate 233. The polarizing axis of the upper polarizing plate 233 is perpendicular to the polarizing axis of the lower polarizing plate 133 of the TFT substrate 100.

The upper phase retardation plate 235 comprises a λ/2 phase retardation plate, namely, a half wave plate (HWP), having an optical axis deviated from the optical axis of the upper polarizing plate 233 by 22.5°.

Since the upper phase retardation plate 235 is configured to have an optical axis deviated from the optical axis of the upper polarizing plate 233, the reflective portions of the pixel regions have a certain viewing angle.

The upper phase retardation plate 235 is formed between the upper polarizing plate 233 and the upper substrate 201, to set the reflective portion 107b of each pixel region 107 to a normally-black mode, in cooperation with the lower polarizing plate 135 of the TFT substrate 100.

That is, when the second data voltage is not applied to the second pixel electrode 127b formed in the reflective portion 107b of the pixel region 107, the externally-incident light is converted into horizontal linearly-polarized light while passing through the upper polarizing plate 233, as shown in FIG. 7A.

The horizontal linearly-polarized light emerging from the upper polarizing plate 233 is then converted into light linearly polarized in a 45° direction while passing through the upper phase retardation plate 235. The converted light is subsequently reflected by the reflective electrode ill. Thus, the light passes two times through the liquid crystal layer 300 having a phase difference of 90°. As a result, the light is converted into light linearly polarized in a 145° (−45°) direction. Finally, the resultant linearly-polarized light reaches the upper phase retardation plate of the color filter substrate 200.

The linearly-polarized light reaching the upper phase retardation plate 235 of the color filter substrate 200 is again converted into light linearly polarized in a 45° direction. By this light, the reflective portion 107b of the pixel region 107 is set to the normally-black mode.

Hereinafter, a method for fabricating the semi-transmissive IPS mode LCD panel according to the present invention will be described with reference to the accompanying drawings.

In accordance with this method, the TFT substrate 100, which constitutes the semi-transmissive IPS mode LCD panel according to the present invention, is first fabricated.

Figure 8A:
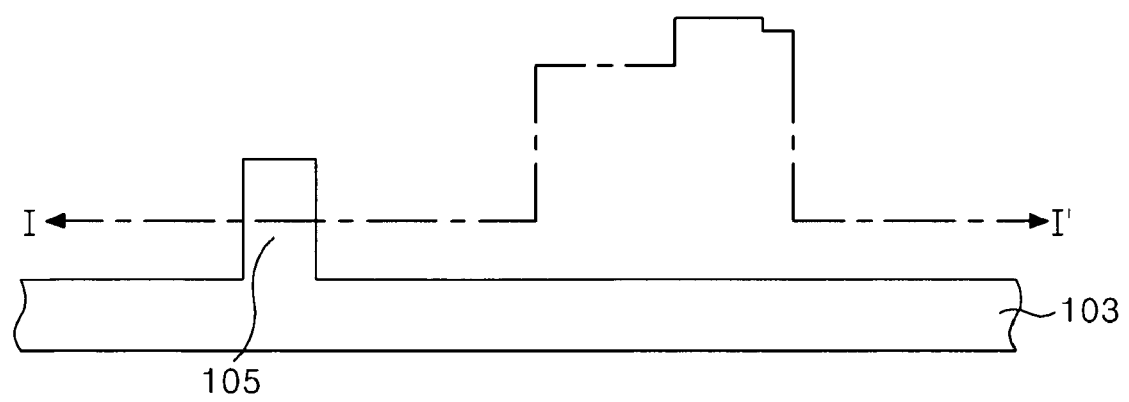
FIGS. 8A and 8B illustrate a thin film transistor (TFT) substrate formed with a first conductive pattern according to the present invention, through a plan view and a sectional view.
Figure 8B:
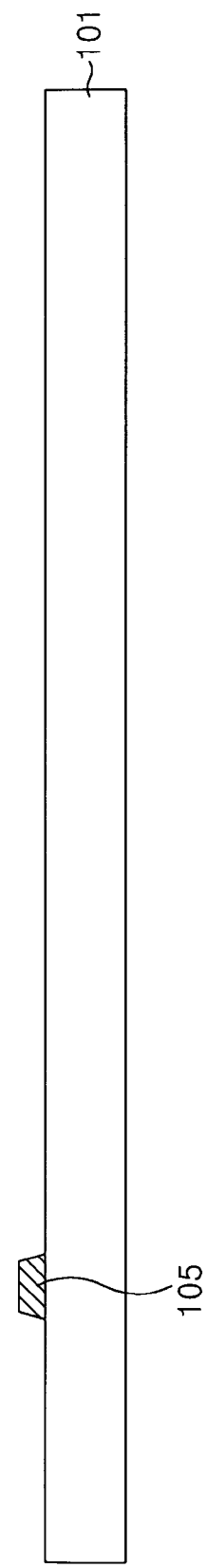

That is, as shown in FIGS. 8A and 8B, a first conductive pattern, which includes the gate lines, and the gate electrodes 105 connected to the gate lines 103, is formed on the lower substrate 101.

This will be described in more detail. A gate metal layer is formed over the lower substrate 101 in accordance with a deposition method such as a sputtering method.

The gate metal layer may have a single layer structure of aluminum (Al)-based metal, copper (Cu), chromium (Cr), or molybdenum (Mo), or a double layer structure of aluminum/niobium (AlNd) and molybdenum (Mo).

A photoresist film is coated over the gate metal layer. Thereafter, a photolithography process using a first mask is carried out for the photoresist film, to form a photoresist pattern exposing a portion of the gate metal layer other than regions where the first conductive pattern will be formed.

Thereafter, the portion of the gate metal layer exposed through the photoresist pattern is etched. The photoresist pattern is then subjected to an ashing process. Thus, the first conductive pattern, which includes the gate lines 103 and the gate electrodes 105 connected to the gate lines 103, is finally formed.

Figure 9A:
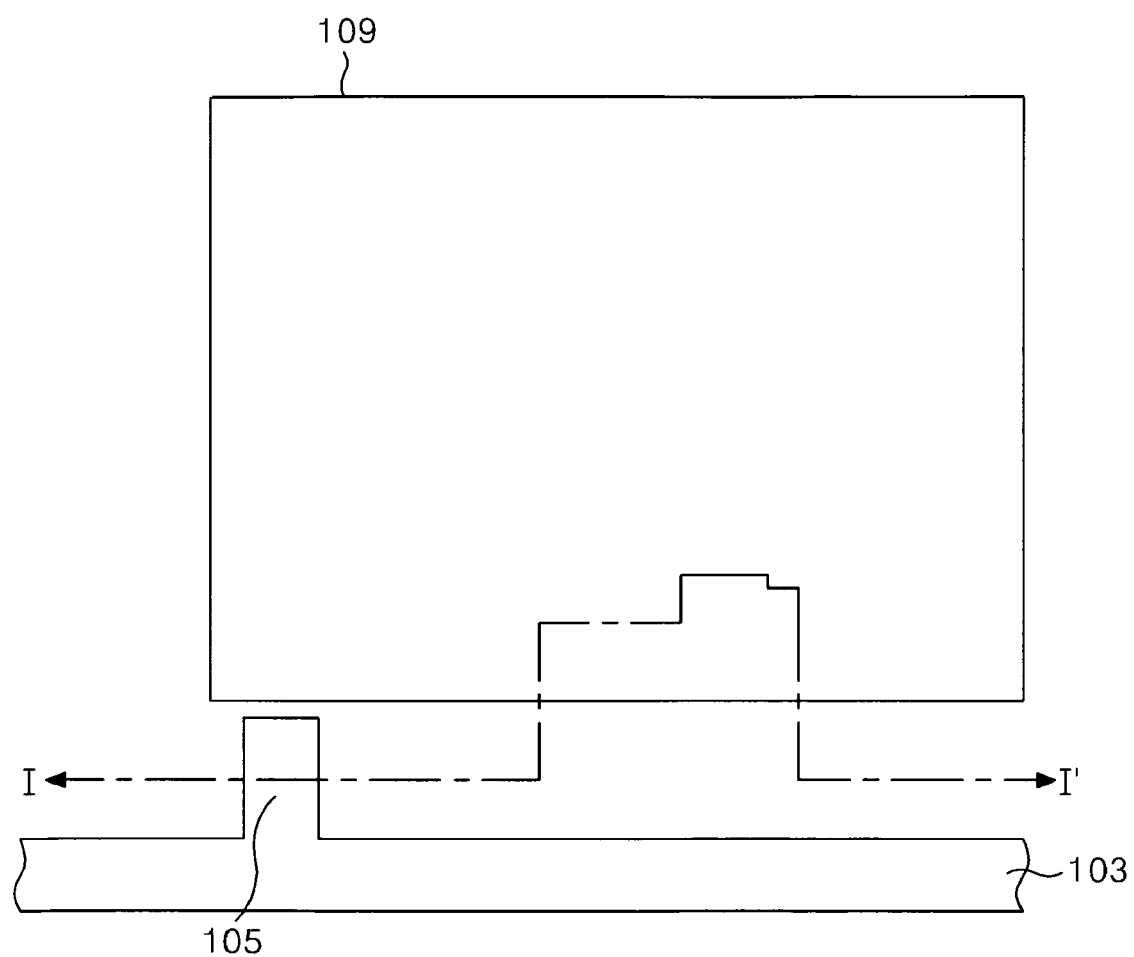
FIGS. 9A and 9B illustrate the TFT substrate formed with common electrodes according to the present invention, through a plan view and a sectional view.
Figure 9B:
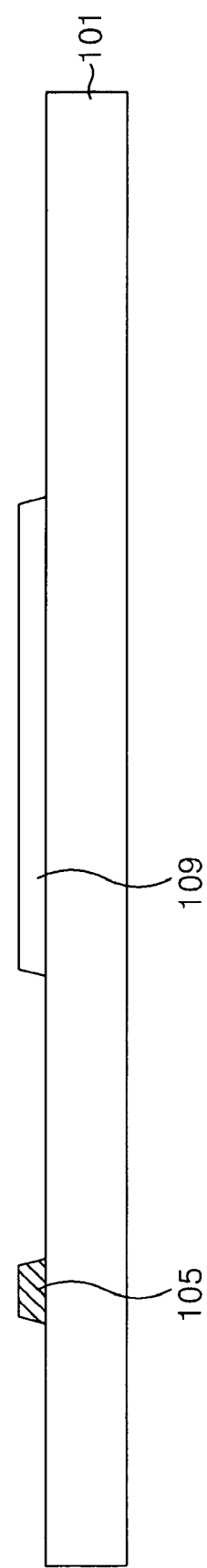

Next, the common electrodes 109, which function to generate a horizontal electric field in the associated pixel regions 107, are formed using a second mask, as shown in FIGS. 9A and 9B.

Each common electrode 109 has a flat plate structure covering the transmissive and reflective portions 107a and 107b of the associated pixel region 107. Each common electrode 109 is made of a transparent conductive material such as ITO, to allow incident light from the backlight unit to be transmitted toward the color filter substrate 200 through the common electrode 109.

Figure 10A:
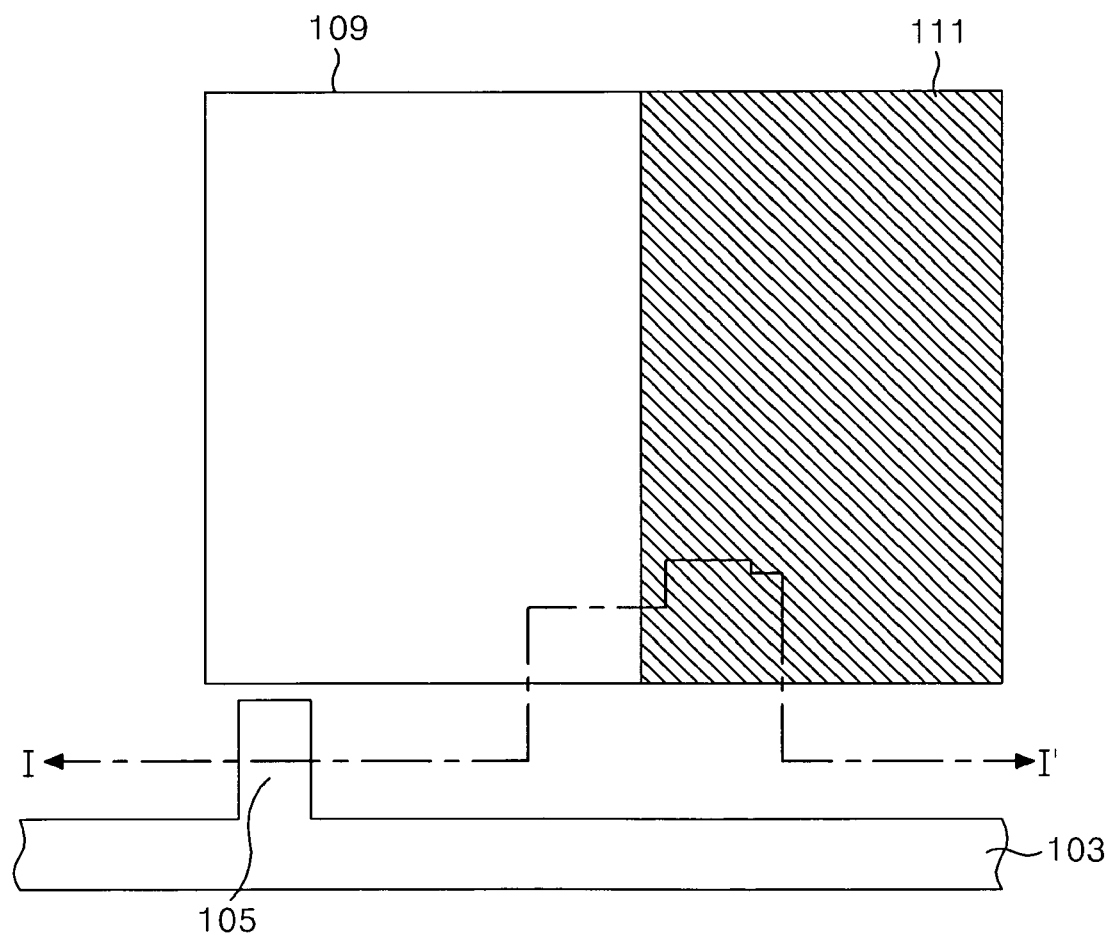
FIGS. 10A and 10B illustrate the TFT substrate formed with reflective electrodes according to the present invention, through a plan view and a sectional view.
Figure 10B:
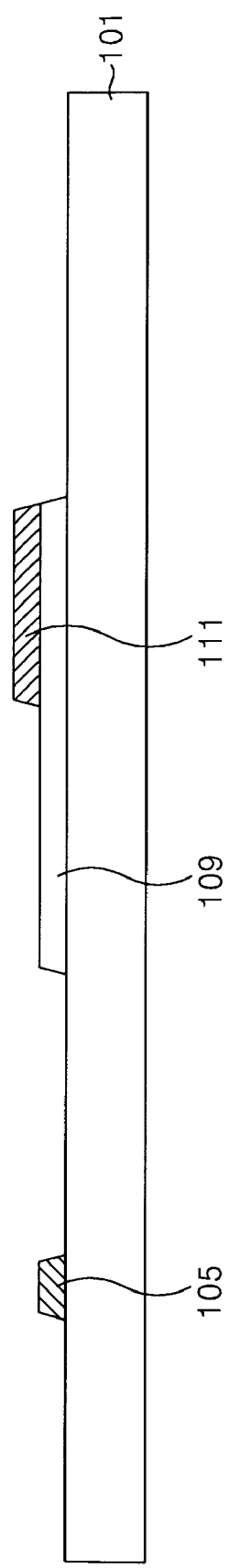

Subsequently, the reflective electrodes 111 are formed using a third mask such that each reflective electrode 111 partially overlaps with the common electrode 109 formed in the reflective portion 107b of the associated pixel electrode 107, as shown in FIGS. 10A and 10B.

Each reflective electrode 111, which overlaps with the common electrode 109 formed in the reflective portion 107b of the associated pixel electrode 107, functions to reflect externally-incident light toward the color filter substrate 200. Each reflective electrode 111 is made of a metal exhibiting excellent reflectance characteristics, for example, aluminum (Al), copper (Cu), or chromium (Cr).

Figure 11A:
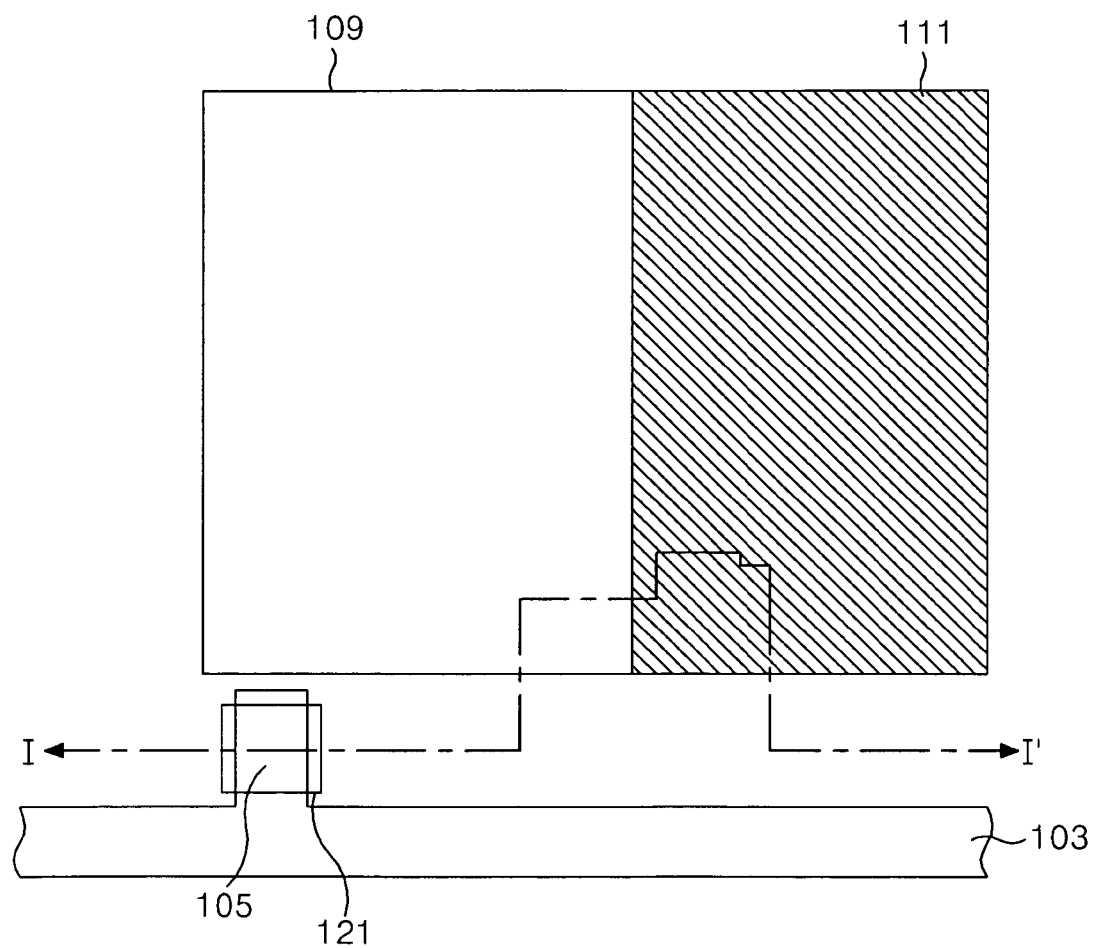

Thereafter, the semiconductor patterns 121, which form respective channels of the TFTs, are formed, as shown in FIGS. 11A and 11B.

This will be described in more detail. A gate insulating film is formed over the lower substrate 101 formed with the reflective electrodes 111, as the gate insulating film 113. A semiconductor layer including an a-Si layer and an $n^+$ silicon layer is then formed over the gate insulating film 113.

A photoresist film is coated over the semiconductor layer. Thereafter, a photolithography process using a fourth mask is carried out for the photoresist film, to form a photoresist pattern exposing a portion of the semiconductor layer other than regions corresponding to the channels of the TFTs.

Thereafter, the portion of the semiconductor layer exposed through the photoresist pattern is etched. The photoresist pattern is then removed. Thus, each semiconductor pattern 121, which includes the active layer 121a forming the channel of the associated TFT and the ohmic contact layer 121b forming an ohmic contact, is formed.

Figure 12A:
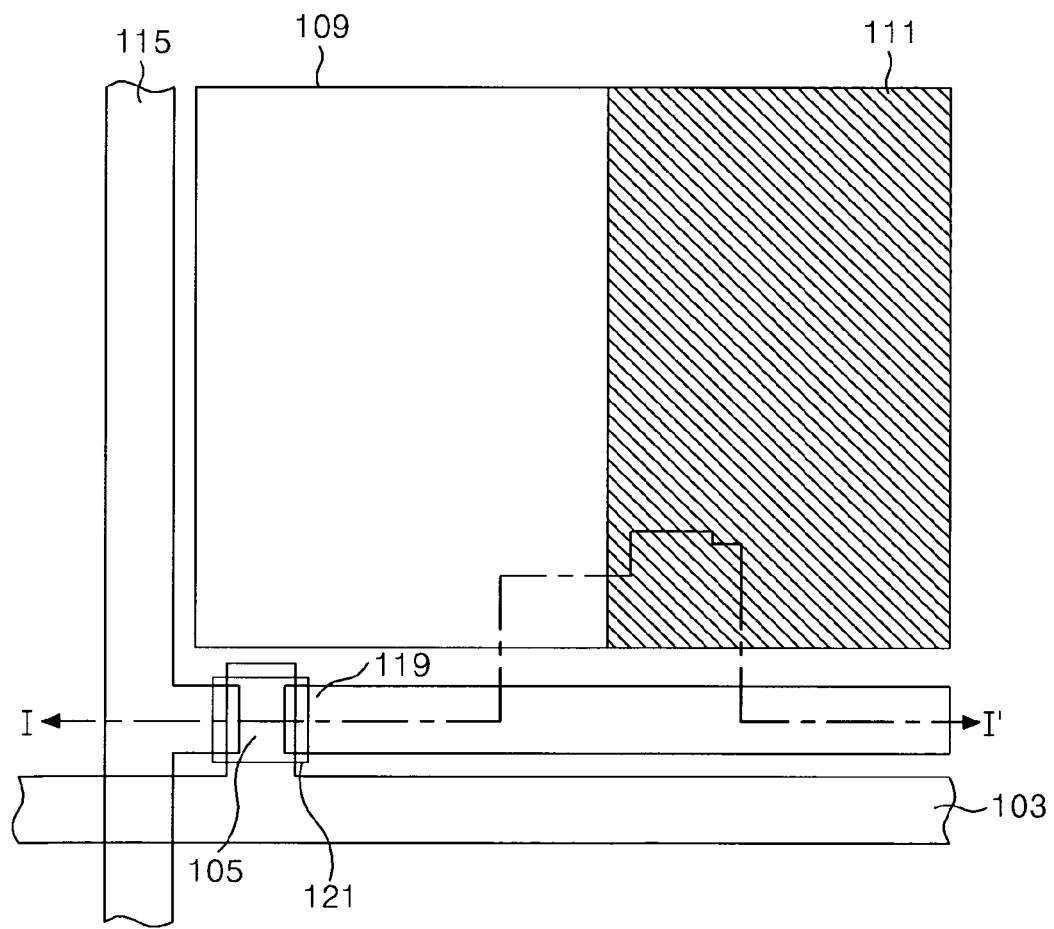

Next, as shown in FIGS. 12A and 12B, a second conductive pattern, which includes the data lines 115, and the source and drain electrodes 117 and 119 connected to the data lines 115, is formed on the lower substrate 101.

This will be described in more detail. A data metal layer is deposited over the gate insulating film 113 formed with the semiconductor pattern 121.

A photoresist film is coated over the data metal layer. Thereafter, a photolithography process using a fifth mask is carried out for the photoresist film, to form a photoresist pattern exposing a portion of the data metal layer other than regions where the second conductive pattern will be formed.

Thereafter, the portion of the data metal layer exposed through the photoresist pattern is etched. The photoresist pattern is then subjected to an ashing process. Thus, the second conductive pattern, which includes the data lines 115, the source electrodes 117 connected to the data lines 115, and the drain electrodes 119 each facing the associated data line 115 at opposite sides of the associated channel, is finally formed.

The drain electrode 119 of each TFT supplies the first data voltage to the first pixel electrode 127a connected to the drain electrode 119 via the associated contact hole 125 extending through the passivation film 123. By the first data voltage, the first horizontal electric field, which orients the liquid crystal layer 300 in a certain direction, is generated between the first pixel electrode 127a and the associated common electrode 109.

The drain electrode 119 of each TFT extends to the reflective portion 107b of the associated pixel region 107, so that the drain electrode 119 overlaps with the associated second pixel electrode 127b via the passivation film 123. Thus, the storage capacitor 129 associated with the TFT is formed.

The storage capacitor 129 functions to supply the second data voltage to the second pixel electrode 127b formed in the reflective portion 107b of the associated pixel region 107, in order to form the second horizontal electric field orienting the liquid crystal layer 300 in the reflective portion 107b of the pixel region 107 in a certain direction.

Figure 13A:
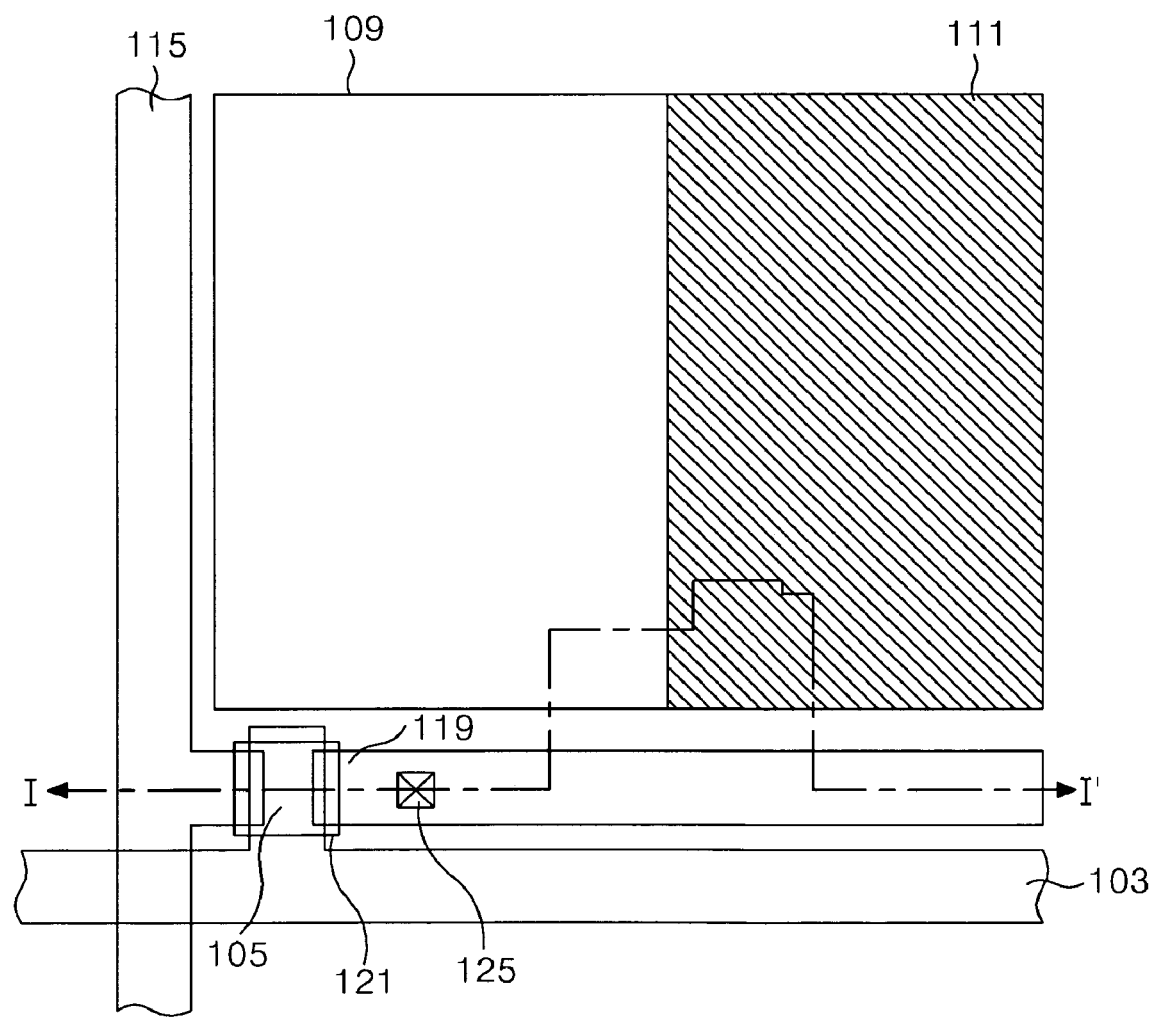

Thereafter, the passivation film 123 covering the TFTs is formed as shown in FIGS. 13A and 13B.

This will be described in more detail. The passivation film 123 is coated over the gate insulating film 113 formed with the second conductive pattern.

Subsequently, a photoresist film is coated over the passivation film 123. Thereafter, a photolithography process using a sixth mask is carried out for the photoresist film, to form a photoresist pattern exposing a desired portion of the passivation film 123.

Thereafter, the portion of the passivation film 123 exposed through the photoresist pattern is etched. The photoresist pattern is then subjected to an ashing process. Thus, the passivation film 123, which has the contact holes 125 exposing respective drain electrodes 119 of the TFTs, is finally formed.

The passivation film 123 is made of an inorganic insulating material such as a silicon nitride, an organic compound such as photo-acryl, or an organic insulating material such as benzocyclobutene (BCB) or perfluocyclobutane (PFCB).

Figure 14A:
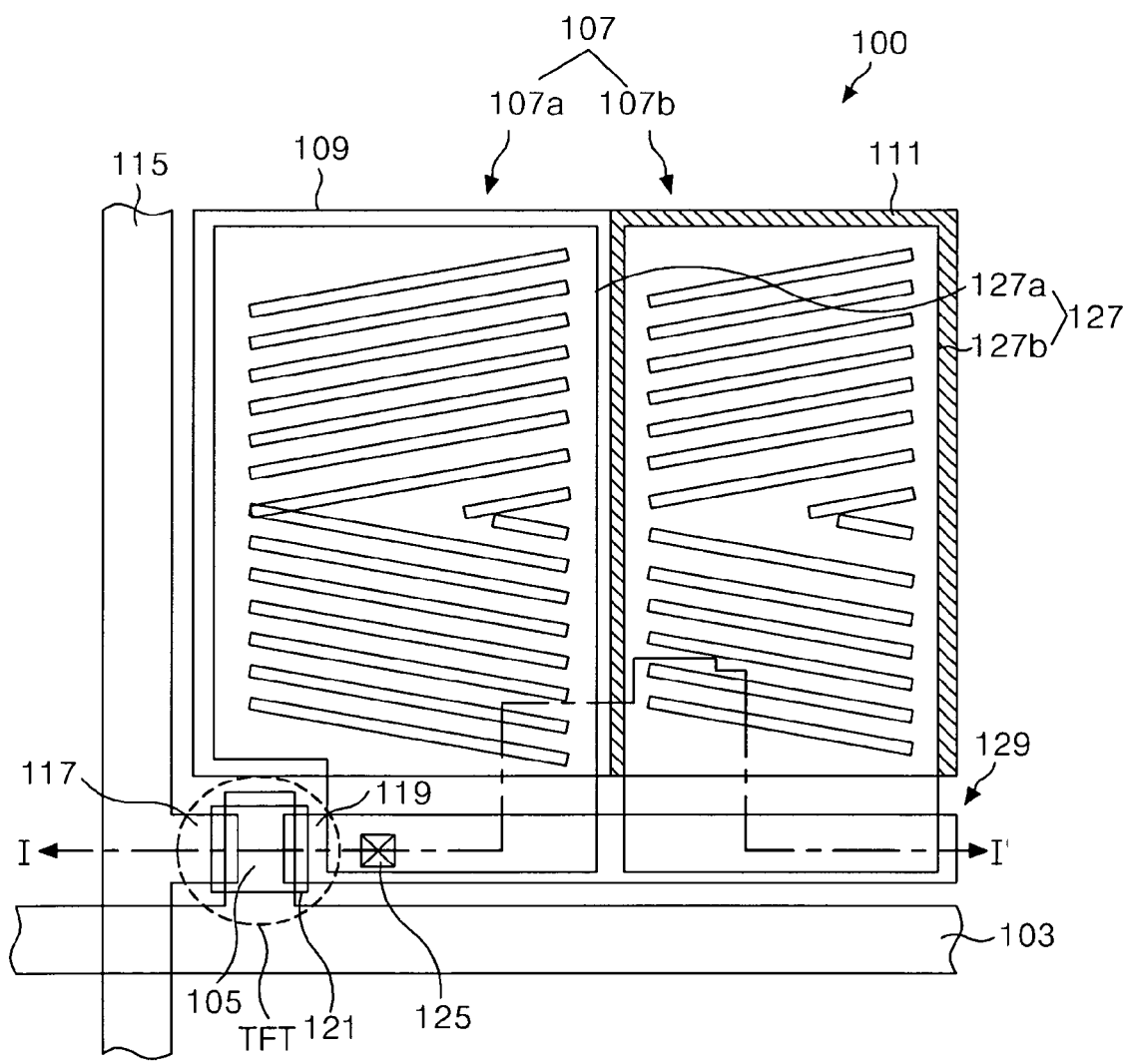
FIGS. 14A and 14B illustrate the TFT substrate formed with pixel electrodes according to the present invention, through a plan view and a sectional view.
Figure 14B:
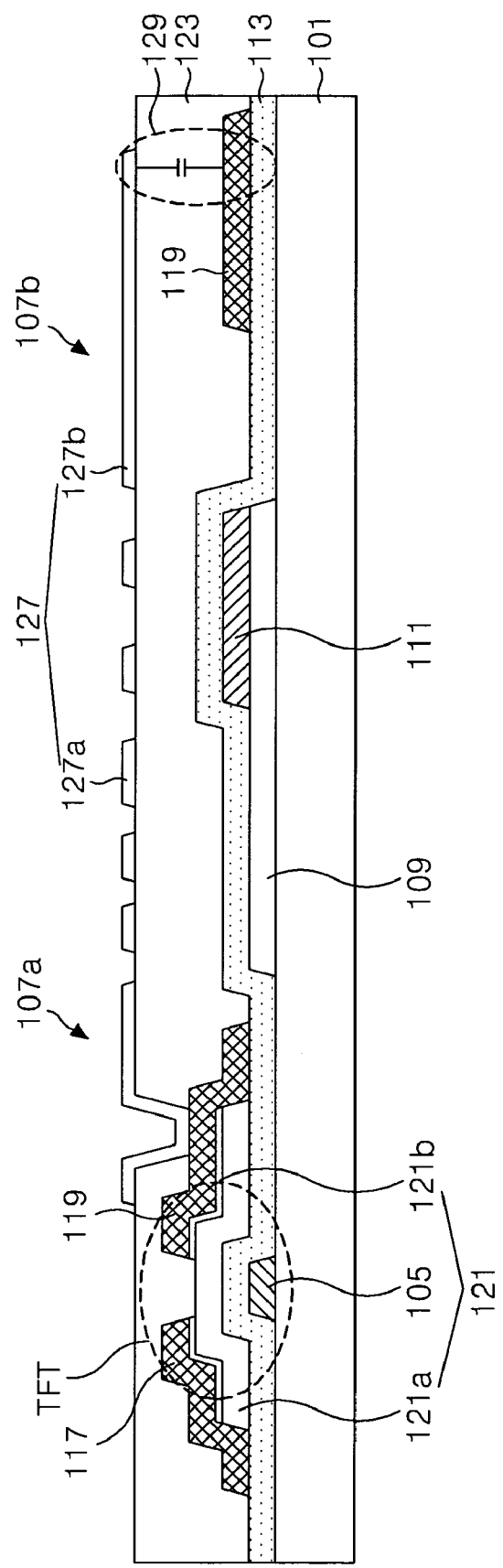

Next, the pixel electrodes 127, which form horizontal electric fields, in cooperation with the common electrodes 109, are formed on the passivation film 123, as shown in FIGS. 14A and 14B.

This will be described in more detail. A transparent conductive layer (ITO) is deposited over the passivation film 123, using a deposition process such as a plasma enhanced chemical vapor deposition (PECVD) process.

Subsequently, a photoresist film is coated over the transparent conductive layer (ITO). Thereafter, a photolithography process using a seventh mask is carried out for the photoresist film, to form a photoresist pattern exposing a portion of the transparent conductive layer (ITO) other than regions where the pixel electrodes 127 will be formed.

Thereafter, the portion of the transparent conductive layer (ITO) exposed through the photoresist pattern is etched. The photoresist pattern is then removed. Thus, the pixel electrodes 127, which function to generate horizontal electric fields orienting the liquid crystal layer 300 dispensed in the cell gap, in cooperation with the common electrodes 109, are formed.

As described above, each pixel electrode 127 includes the first and second pixel electrodes 127a and 127b respectively forming the first and second horizontal electric fields to orient the portions of the liquid crystal layer 300 in the transmissive and reflective portions 107a and 107b of the associated pixel region 107, in cooperation with the common electrode 109. Each of the first and second pixel electrodes 127a and 127b has a plurality of slits shaped into symmetrical comb patterns, to allow the associated horizontal electric field to pass through the pixel electrode.

The first pixel electrode 127a is connected to the drain electrode 119 of the associated TFT via the associated contact hole 125 formed through the passivation film 123. The first pixel electrode 127a forms the first horizontal electric field in accordance with the first data voltage supplied from the drain electrode 119. By the generated first horizontal electric field, the liquid crystals dispensed in the transmissive portion 107a of the associated pixel region 107 are oriented in a certain direction.

The second pixel electrode 127b overlaps with the drain electrode 119 while being spaced apart from the first pixel electrode 127a by a certain distance, under the condition in which the passivation film 123 is interposed between the second pixel electrode 127b and the drain electrode 119. The second pixel electrode 127b forms the second horizontal electric field in accordance with the second data voltage supplied from the associated storage capacitor 129, in cooperation with the associated common electrode 109. By the generated second horizontal electric field, the liquid crystals dispensed in the reflective portion 107b of the associated pixel region 107 are oriented in a certain direction.

The second data voltage applied to the second pixel electrode 127b is lower than the first data voltage, due to a voltage drop caused by a parasitic resistance formed in the storage capacitor 129.

That is, as the second data voltage, which is lower than the first data voltage, is supplied to the second pixel electrode 127b, the effective refractive index of the liquid crystal layer 300 in the reflective portion 107b is reduced. As a result, there is no phase difference between the transmissive and reflective portions 107a and 107b of the pixel region 107. Thus, a uniform luminance is obtained in the pixel region 107.

Figure 15A:
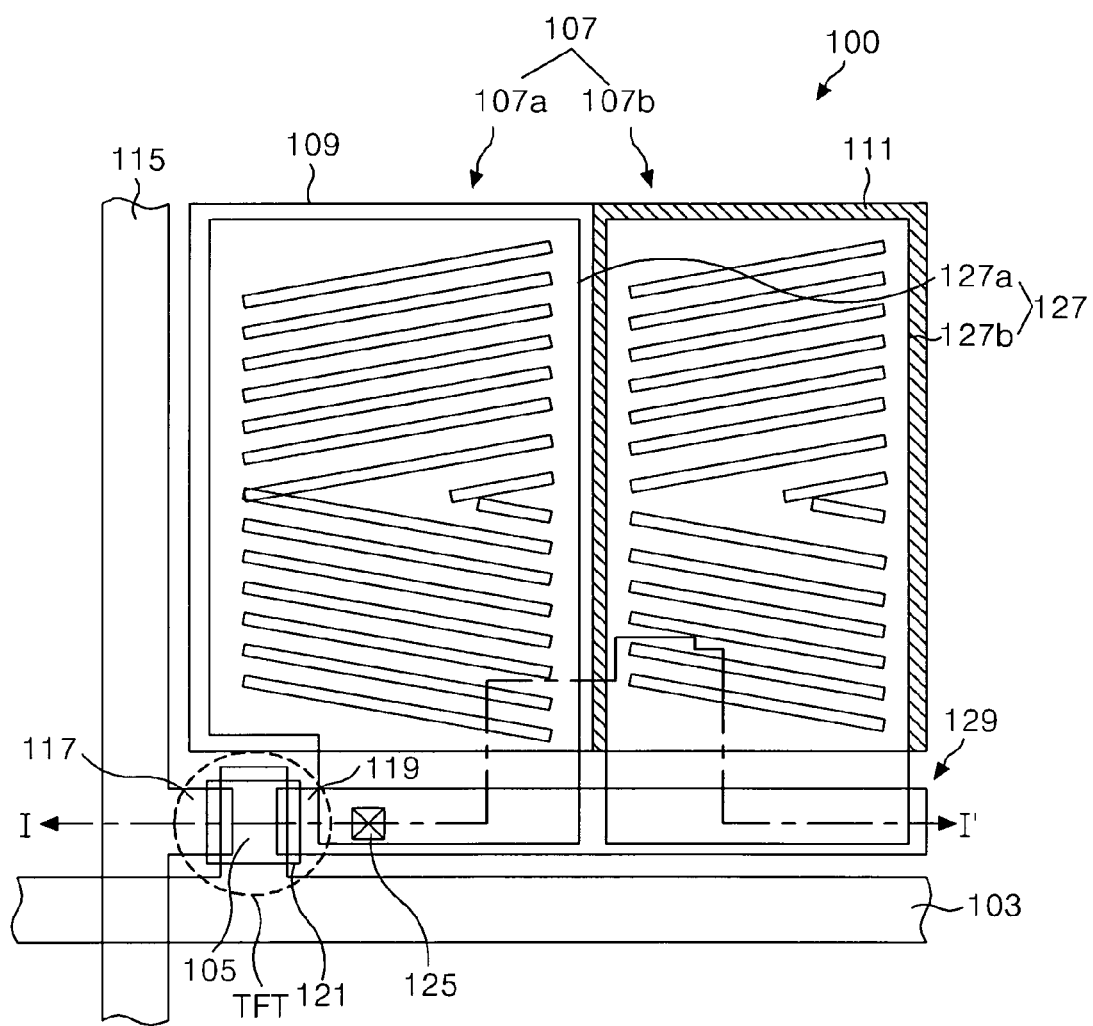
FIGS. 15A and 15B illustrate the TFT substrate formed with a lower orientation film according to the present invention, through a plan view and a sectional view.
Figure 15B:
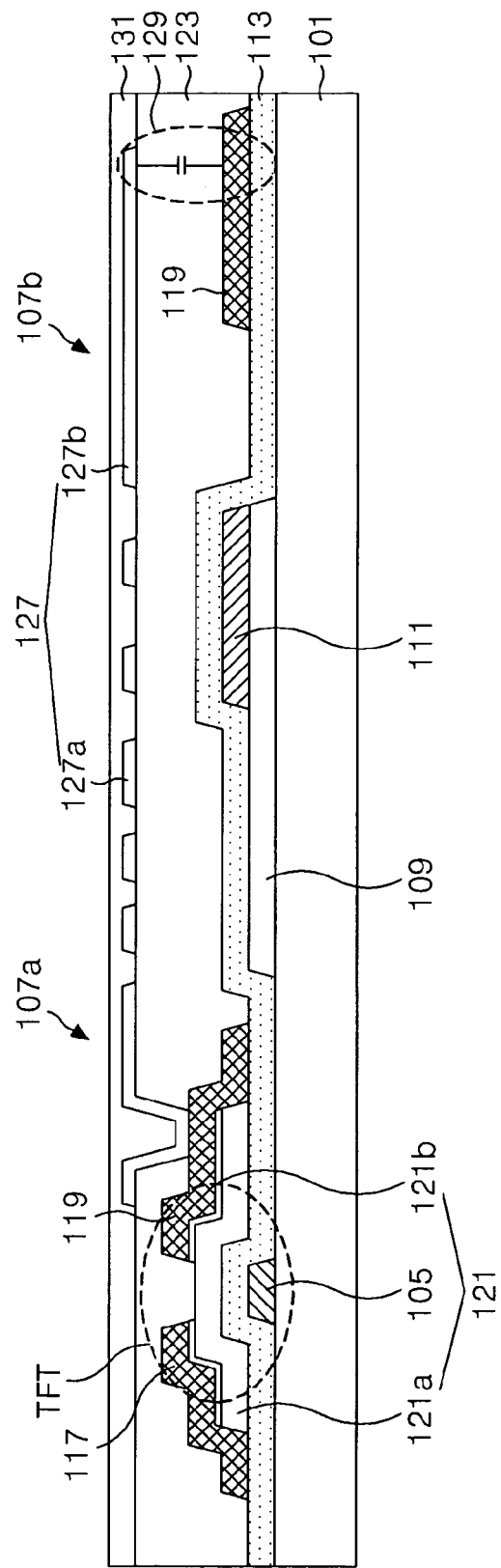

Next, the lower orientation film 131 is formed to cover the pixel electrodes 127, as shown in FIGS. 15A and 15B. As described above, the lower orientation film 131 functions to orient the liquid crystal layer 300 dispensed in the cell gap in a certain direction.

The lower orientation film 131, which functions to orient the liquid crystal layer 300 in the cell gap in a certain direction, is formed by rubbing an organic orientation film made of polyimide or the like through a rubbing process. The lower orientation film 131 is formed with orientation grooves (not shown) to align the liquid crystal molecules of the liquid crystal layer 300 in a certain direction.

Figure 16A:
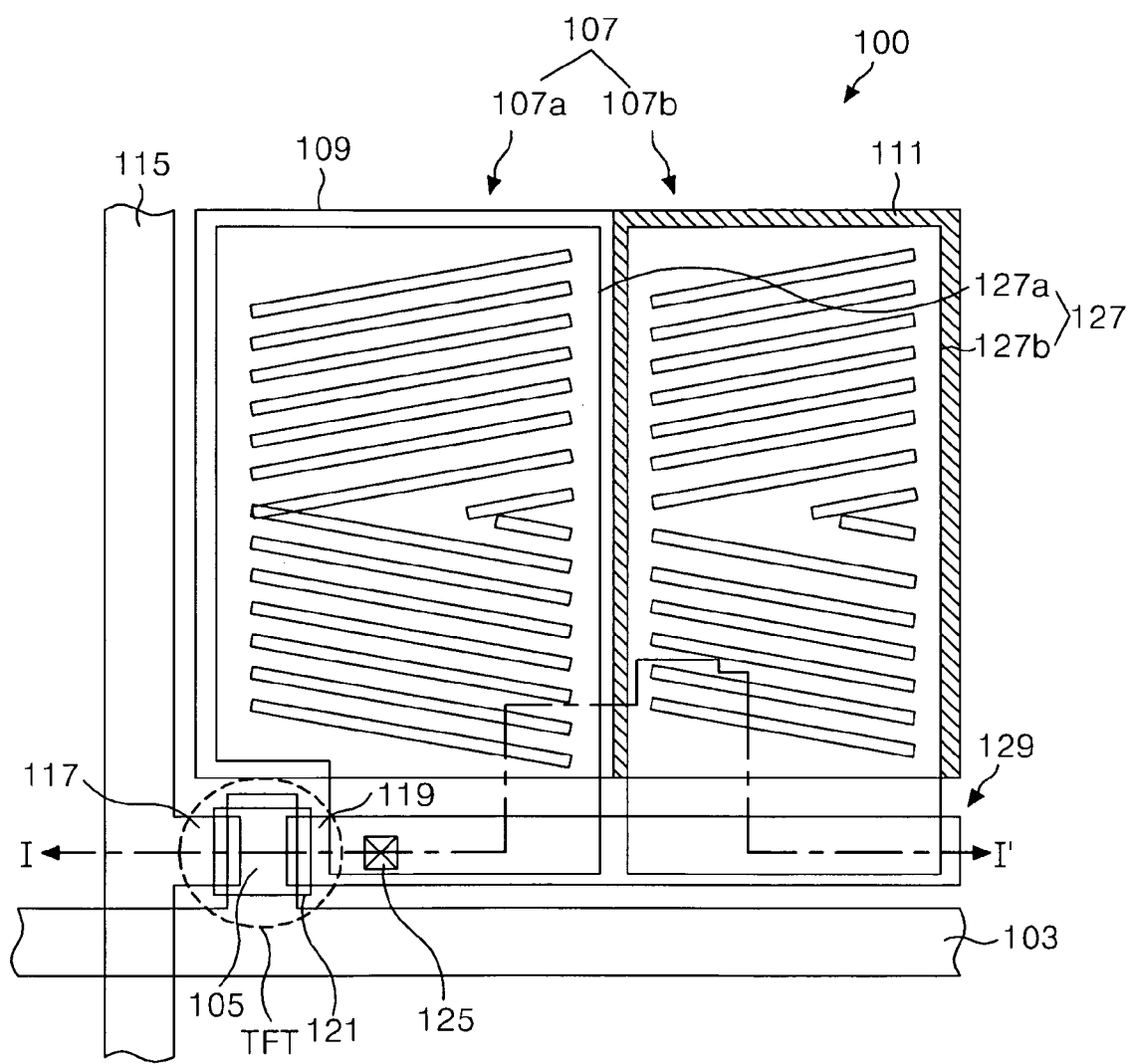
FIGS. 16A and 16B illustrate the TFT substrate sequentially formed with a lower polarizing plate and a lower phase retardation plate according to the present invention, through a plan view and a sectional view.
Figure 16B:
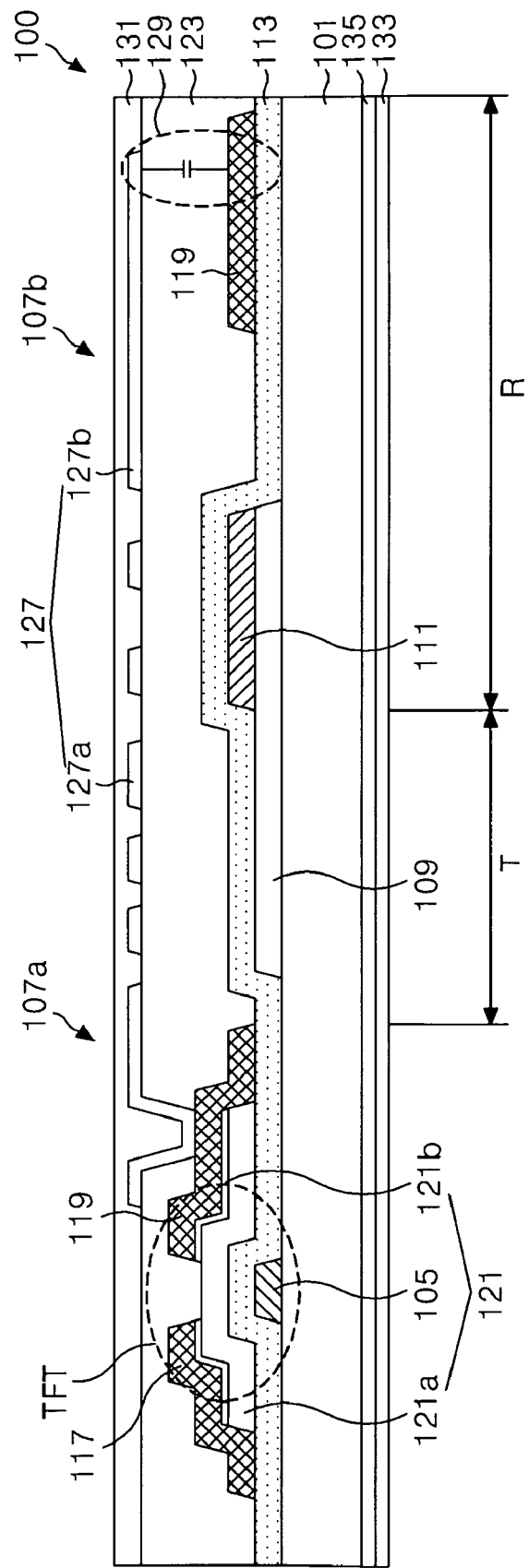

Thereafter, the lower polarizing plate 133 and the lower phase retardation plate 135, which function to polarize and phase-retard incident light from a backlight unit, are sequentially formed over the back surface of the lower substrate 101, as shown in FIGS. 16A and 16B.

The lower polarizing plate 133 functions to allow only the components of the incident light from the backlight unit having an optical axis aligned with the polarizing axis of the lower polarizing plate 133 to be transmitted toward the color filter substrate 200 through the lower polarizing plate 133. The polarizing axis of the lower polarizing plate 133 is parallel with the rubbing direction of the lower orientation film 131 while being perpendicular to the polarizing axis of the upper polarizing plate 233 of the color filter substrate 200.

The lower phase retardation plate 135 is formed between the lower substrate 101 and the lower polarizing plate 133, to set the transmissive portion 107a of each pixel region 107 to a normally-black mode, in cooperation with the upper polarizing plate 235 of the color filter substrate 200.

In this case, the lower phase retardation plate 135 comprises a $\lambda/2$ phase retardation plate, namely, a half wave plate (HWP), having an optical axis deviated from the optical axis of the lower polarizing plate 133 by 67.5° or deviated from the optical axis of the upper polarizing plate 235 of the color filter substrate 200 by 157.5°.

After the fabrication of the TFT substrate 100 as described above, the color filter substrate 200, which constitutes the semi-transmissive IPS mode LCD panel, is fabricated.

Figure 17A:
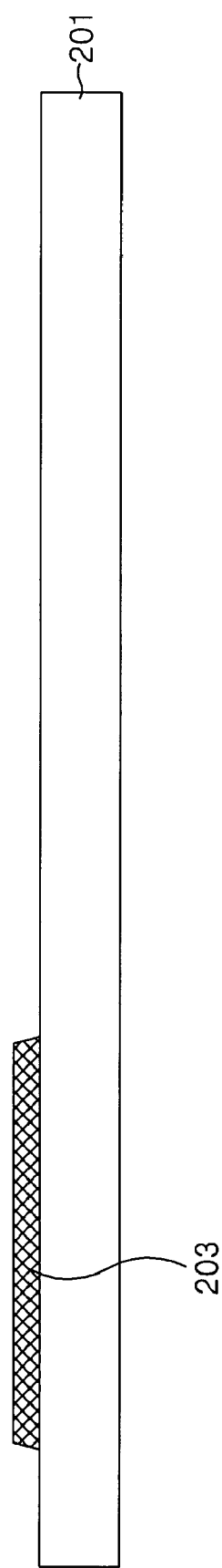
FIGS. 17A to 17E are sectional views illustrating a process for fabricating a color filter substrate included in the semi-transmissive IPS mode LCD panel according to the present invention.

First, the black matrix 203 is formed on the upper substrate 201, using an opaque metal such as chromium (Cr) or chromium oxide ($CrO_x$), as shown in FIG. 17A.

The black matrix 203 is formed on the upper substrate 201 in the form of a matrix, to partition a plurality of cell regions where the color filters 205 will be formed, and to prevent optical interference between adjacent cell regions.

Figure 17B:
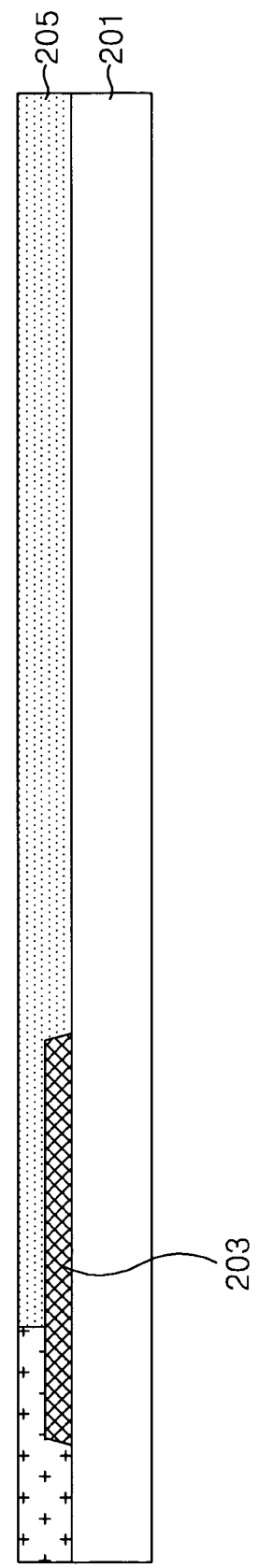

Thereafter, the color filters 205 are formed in the cell regions partitioned by the black matrix 203 in a sequential manner, as shown in FIG. 17B.

This will be described in more detail. One of red, green, and blue photosensitive color resin materials is formed over the upper substrate 201 in accordance with a pigment spraying process, to form a photosensitive color resin material film.

A photoresist film is coated over the photosensitive color resin material film formed over the upper substrate 201 in the pigment spraying process. Thereafter, a photolithography process using a mask is carried out for the photoresist film, to form a photoresist pattern exposing a portion of the photosensitive color resin material film other than regions where the associated color filters will be formed.

Thereafter, the portion of the gate metal layer exposed through the photoresist pattern is etched. The photoresist pattern is then subjected to an ashing process. The above procedures are repeated for the remaining photosensitive color resin materials. Thus, the formation of the color filters 205, each of which includes the red color filter 205R, green color filter 205G, and blue color filter 205B, is completed.

Figure 17C:
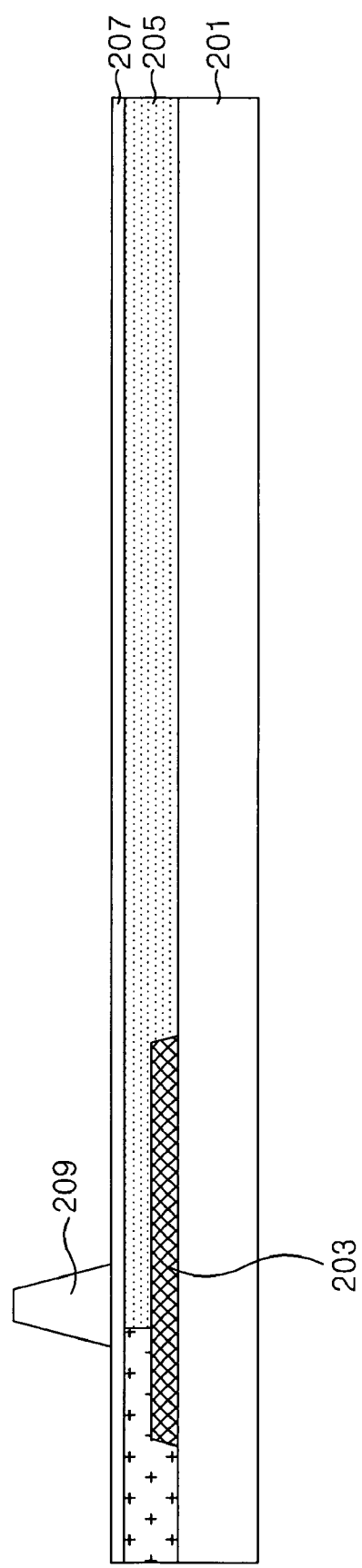

Subsequently, the overcoating layer 207, which removes steps formed by the color filters 205, is formed over the upper substrate 201, as shown in FIG. 17C.

The overcoating layer 207 is made of a thermosetting resin material such as polydimethylsiloxane. The overcoating layer 207 functions to remove steps formed due to the color filters 205, and thus to allow the upper orientation film 231, which will be formed over the upper substrate 201, to have a planarized surface.

Simultaneously with the formation of the overcoating layer 207, the spacers 209, which function to maintain the cell gap defined between the substrates 100 and 200 for the dispense of the liquid crystal layer 300, may be formed.

Figure 17D:
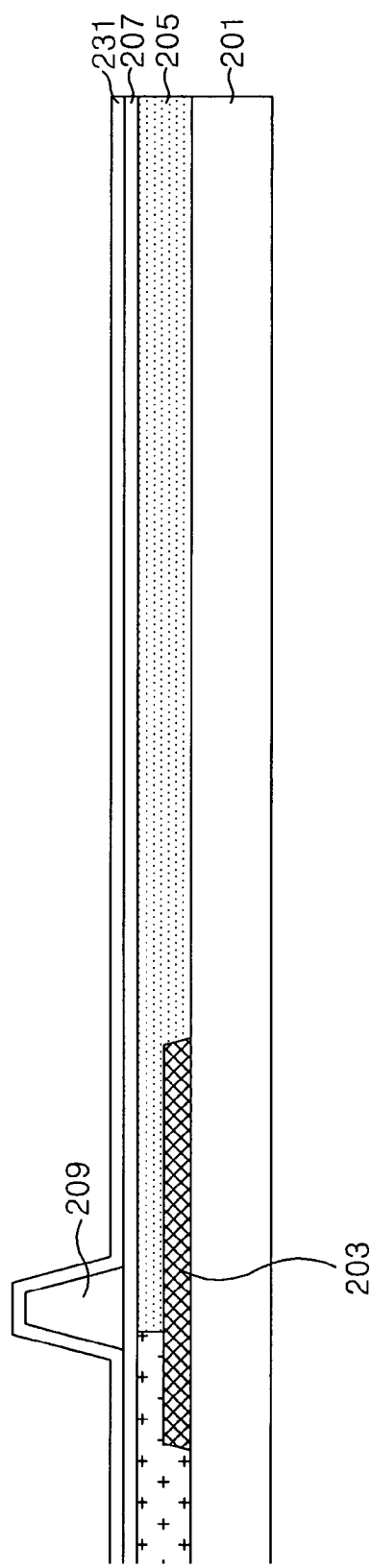

Thereafter, the upper orientation film 231, which functions to orient the liquid crystal layer 300 dispensed in the cell gap in a certain direction, is formed as shown in FIG. 17D.

The upper orientation film 231 is formed by rubbing an organic orientation film made of polyimide or the like through a rubbing process. The upper orientation film 231 is formed with orientation grooves (not shown) to align the liquid crystal molecules of the liquid crystal layer 300 in a certain direction.

Figure 17E:
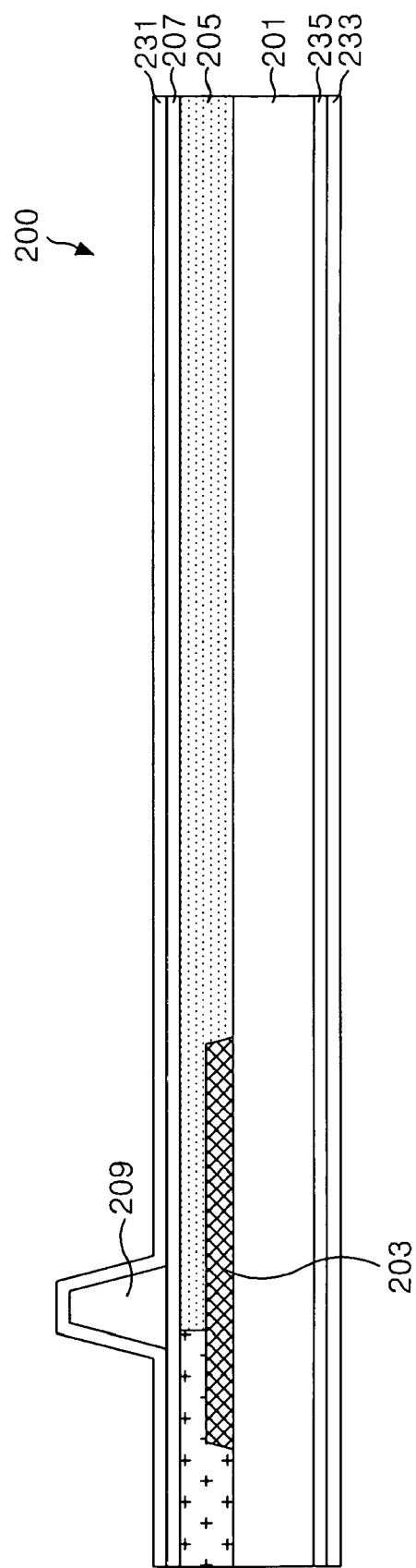

Next, the upper polarizing plate 233 and the upper phase retardation plate 235, which function to polarize and phase-retard externally-incident light, are sequentially formed over the back surface of the upper substrate 201, as shown in FIG. 17E.

The upper polarizing plate 233 functions to allow only the components of externally-incident light having an optical axis aligned with the polarizing axis of the upper polarizing plate 233 to be transmitted toward the pixel regions 107 through the upper polarizing plate 233. The polarizing axis of the upper polarizing plate 233 is perpendicular to the polarizing axis of the lower polarizing plate 133 of the TFT substrate 100.

The upper phase retardation plate 235 comprises a $\lambda/2$ phase retardation plate, namely, a half wave plate (HWP), having an optical axis deviated from the optical axis of the upper polarizing plate 233 by 22.5°.

Since the upper phase retardation plate 235 is configured to have an optical axis deviated from the optical axis of the upper polarizing plate 233, it is possible to set the viewing angle of the pixel regions 107 such that the pixel regions 107 do not have a narrow viewing angle, but have a wide viewing angle.

The upper phase retardation plate 235 is formed between the upper polarizing plate 233 and the upper substrate 201, to set the reflective portion 107b of each pixel region 107 to a normally-black mode, in cooperation with the lower polarizing plate 135 of the TFT substrate 100.

After the fabrication of the color filter substrate 200 as described above, the liquid crystal layer 300 is dispensed in the cell gap of the semi-transmissive horizontal IPS mode LCD panel according to the present invention. The substrates 100 and 200 are then assembled.

In this case, the liquid crystal layer 300 is dispensed in the cell gap between the substrates 100 and 200 in a state of being oriented to have an optical axis deviated from the optical axis of the upper polarizing plate 233 of the color filter substrate 200 by a certain angle, in particular, 90°, so that the liquid crystal layer 300 functions to polarize incident light by $\lambda/2$.

As apparent from the above description, in accordance with the semi-transmissive in-plane switching mode liquid crystal display panel and the fabrication method thereof, different horizontal electric fields are generated in the transmissive and reflective portions of each pixel region, so that each pixel region can exhibit the same luminance in the transmissive and reflective portions while having a single cell gap structure.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An in-plane switching mode liquid crystal display panel having pixel regions each including a transmissive portion and a reflective portion, comprising:
    a color filter substrate;
    a thin film transistor substrate assembled with the color filter substrate such that a cell gap is defined between the thin film transistor substrate and the color filter substrate, the thin film transistor substrate including storage capacitors each forming, in the reflective portion of an associated one of the pixel regions, a horizontal electric field different from a horizontal electric field formed in the transmissive portion of the associated pixel region, to compensate for a phase difference generated in the associated pixel region; and
    a liquid crystal layer dispensed in the cell gap, and oriented in a predetermined direction; and
    wherein the thin film transistor substrate comprises:
    a lower substrate;
    gate lines formed on one surface of the lower substrate;
    data lines intersecting the gate lines while being insulated from the gate lines, to define the pixel regions;
    thin film transistors respectively formed at intersections of the gate and data lines; common electrodes respectively formed to the pixel regions;
    reflective electrodes each formed in the reflective portion of an associated one of the pixel regions such that the reflective electrode overlaps with the associated common electrode;
    pixel electrodes each including a first pixel electrode forming a first horizontal electric field in the transmissive portion of an associated one of the pixel regions in accordance with a first data voltage supplied from an associated one of the thin film transistors, and a second pixel electrode forming a second horizontal electric field in the reflective portion of the associated pixel region in accordance with a second data voltage supplied from an external of the panel;
    the storage capacitors each supplying the second data voltage to the second pixel electrode of an associated one of the pixel electrodes; and
    a lower orientation film orienting the liquid crystal layer dispensed in the cell gap in a predetermined direction.

2. The in-plane switching mode liquid crystal display panel according to claim 1, wherein the color filter substrate comprises:
    an upper substrate;
    a black matrix formed on one surface of the upper substrate, to partition the pixel regions;
    color filters respectively formed in the pixel regions;
    an overcoating layer removing steps formed by the color filters;
    spacers formed on the overcoating layer, to maintain the cell gap, in which the liquid crystal layer is dispensed;
    an upper orientation film formed over the overcoating layer formed with the spacers, to orient the liquid crystal layer in a predetermined direction;
    an upper polarizing plate formed on an opposite surface of the upper substrate; and
    an upper phase retardation plate having an optical axis deviated from an optical axis of the upper polarizing plate by a predetermined angle.

3. The in-plane switching mode liquid crystal display panel according to claim 2, wherein the optical axis of the upper phase retardation plate is deviated from the optical axis of the upper polarizing plate by 22.5°.

4. The in-plane switching mode liquid crystal display panel according to claim 3, wherein the upper phase retardation plate comprises a $\lambda/2$ phase retardation plate.

5. The in-plane switching mode liquid crystal display panel according to claim 2, wherein the orientation direction of the liquid crystal layer dispensed in the cell gap is deviated from the optical axis of the upper polarizing plate by 90°.

6. The in-plane switching mode liquid crystal display panel according to claim 1, wherein the thin film transistor substrate further comprises:
    a lower polarizing plate formed on an opposite surface of the lower substrate, to allow vertical linearly-polarized components of light incident from a backlight unit, which have an optical axis parallel to an optical axis of the lower polarizing plate, to be transmitted through the lower polarizing plate; and
    a lower phase retardation plate having an optical axis deviated from the optical axis of the lower polarizing plate by a predetermined angle.

7. The in-plane switching mode liquid crystal display panel according to claim 1, wherein each pixel electrode is formed with symmetrical slits allowing the horizontal electric fields to pass through the pixel electrode.

8. The in-plane switching mode liquid crystal display panel according to claim 1, wherein the first and second pixel electrodes are spaced apart from each other by a predetermined distance.

9. The in-plane switching mode liquid crystal display panel according to claim 8, wherein the first pixel electrode is connected to a drain electrode of the associated thin film transistor via a contact hole extending through a passivation film formed between the first pixel electrode and the drain electrode.

10. The in-plane switching mode liquid crystal display panel according to 1, wherein each of the storage capacitors comprises:
    a drain electrode of an associated one of the thin film transistors; and
    the second pixel electrode formed to overlap with the drain electrode in a state in which a passivation film is interposed between the second pixel electrode and the drain electrode.

11. The in-plane switching mode liquid crystal display panel according to claim 10, wherein each of the storage capacitors supplies the second data voltage at a level lower than the first data voltage, due to a parasitic resistance formed in the storage capacitor.

12. The in-plane switching mode liquid crystal display panel according to claim 10, wherein the drain electrode extends to the reflective portion of the associated pixel region.

13. The in-plane switching mode liquid crystal display panel according to claim 12, wherein the optical axis of the lower phase retardation plate is deviated from the optical axis of the lower polarizing plate by 67.5°.

14. The in-plane switching mode liquid crystal display panel according to claim 12, wherein the lower phase retardation plate comprises a $\lambda/2$ phase retardation plate.

15. The in-plane switching mode liquid crystal display panel according to claim 1, wherein the cell gap between the color filter substrate and the thin film transistor substrate has a single cell gap structure.

16. A method for fabricating an in-plane switching mode liquid crystal display panel having pixel regions each including a transmissive portion and a reflective portion, comprising:
fabricating a color filter substrate;
fabricating a thin film transistor substrate assembled with the color filter substrate such that a cell gap is defined between the thin film transistor substrate and the color filter substrate, the thin film transistor substrate including storage capacitors each forming, in the reflective portion of an associated one of the pixel regions, a horizontal electric field different from a horizontal electric field formed in the transmissive portion of the associated pixel region, to compensate for a phase difference generated in the associated pixel region; and
dispensing a liquid crystal layer in the cell gap, the liquid crystal layer being oriented in a predetermined direction;
wherein the step of forming the thin film transistor substrate comprises:
forming gate lines and gate electrodes connected to the gate lines on one surface of a lower substrate;
forming common electrodes on the same layer as the gate electrode such that the common electrodes cover the pixel regions, respectively;
forming reflective electrodes such that the reflective electrodes overlap with the reflective portions of the pixel regions, respectively;
forming data lines intersecting the gate lines to define the pixel regions, source electrodes, and drain electrodes each facing an associated one of the source electrodes at opposite sides of a channel connected to an associated one of the data lines;
forming pixel electrodes each including a first pixel electrode forming a first horizontal electric field in the transmissive portion of an associated one of the pixel regions in accordance with a first data voltage supplied from an associated one of the drain electrodes, and a second pixel electrode forming a second horizontal electric field in the reflective portion of the associated pixel region in accordance with a second data voltage supplied from an external of the panel;
forming the storage capacitors each supplying the second data voltage to the second pixel electrode of an associated one of the pixel electrodes; and
forming a lower orientation film orienting the liquid crystal layer dispensed in the cell gap in a predetermined direction.

17. The method according to claim 16, wherein the step of fabricating the color filter substrate comprises:
forming a black matrix on one surface of an upper substrate such that the black matrix partitions the pixel regions;
forming color filters in the pixel regions, respectively;
forming an overcoating layer to remove steps formed by the color filters;
forming spacers to maintain the cell gap;
forming an upper orientation film over the overcoating layer formed with the spacers, to orient the liquid crystal layer in a predetermined direction;
forming an upper polarizing plate on an opposite surface of the upper substrate, to allow horizontal linearly-polarized components of incident light, which have an optical axis parallel to an optical axis of the upper polarizing plate, to be transmitted through the upper polarizing plate; and
forming an upper phase retardation plate having an optical axis deviated from an optical axis of the upper polarizing plate by a predetermined angle.

18. The method according to claim 17, wherein the optical axis of the upper phase retardation plate is deviated from the optical axis of the upper polarizing plate by 22.5°.

19. The method according to claim 18, wherein the upper phase retardation plate comprises a λ/2 phase retardation plate.

20. The method according to claim 17, wherein the orientation direction of the liquid crystal layer dispensed in the cell gap is deviated from the optical axis of the upper polarizing plate by 90°.

21. The method according to claim 16, further comprising:
forming a lower polarizing plate on an opposite surface of the lower substrate, to allow vertical linearly-polarized components of light incident from a backlight unit, which have an optical axis parallel to an optical axis of the lower polarizing plate, to be transmitted through the lower polarizing plate; and
forming a lower phase retardation plate having an optical axis deviated from the optical axis of the lower polarizing plate by a predetermined angle.

22. The method according to claim 21, wherein the optical axis of the lower phase retardation plate is deviated from the optical axis of the lower polarizing plate by 67.5°.

23. The method according to claim 21, wherein the lower phase retardation plate comprises a λ/2 phase retardation plate.

24. The method according to claim 16, wherein each pixel electrode is formed with symmetrical slits allowing the horizontal electric fields to pass through the pixel electrode.

25. The method according to claim 16, wherein the first and second pixel electrodes are spaced apart from each other by a predetermined distance.

26. The method according to claim 25, wherein the first pixel electrode is connected to an associated one of the drain electrodes via a contact hole extending through a passivation film formed between the first pixel electrode and the drain electrode.

27. The method according to claim 16, wherein each of the storage capacitors comprises:
an associated one of the drain electrodes; and
the second pixel electrode formed to overlap with the drain electrode in a state in which a passivation film is interposed between the second pixel electrode and the drain electrode.

28. The method according to claim 27, wherein each of the storage capacitors supplies the second data voltage at a level lower than the first data voltage, due to a parasitic resistance formed in the storage capacitor.

29. The method according to claim 27, wherein the drain electrode extends to the reflective portion of an associated one of the pixel regions.

30. The method according to claim 16, wherein the cell gap between the color filter substrate and the thin film transistor substrate has a single cell gap structure.

* * * * *